US012714003B2

(12) United States Patent
Brace

(10) Patent No.: US 12,714,003 B2
(45) Date of Patent: Aug. 25, 2026

(54) BATCH SEED COATING DEVICES, SCALE FILLERS, MIXERS, DISCHARGE CHUTES AND GATES, AND RELATED SYSTEMS AND METHODS

(71) Applicant: Timothy Todd Brace, Lloydminster (CA)

(72) Inventor: Timothy Todd Brace, Lloydminster (CA)

( * ) Notice: Subject to any disclaimer, the term of this patent is extended or adjusted under 35 U.S.C. 154(b) by 0 days.

(21) Appl. No.: 17/918,071

(22) PCT Filed: Apr. 10, 2021

(86) PCT No.: PCT/CA2021/050482
§ 371 (c)(1),
(2) Date: Oct. 10, 2022

(87) PCT Pub. No.: WO2021/203209
PCT Pub. Date: Oct. 14, 2021

(65) Prior Publication Data

US 2023/0157199 A1 May 25, 2023

Related U.S. Application Data

(60) Provisional application No. 63/056,545, filed on Jul. 24, 2020, provisional application No. 63/008,588, filed on Apr. 10, 2020.

(51) Int. Cl.
*A01C 1/06* (2006.01)
*B01J 2/00* (2006.01)

(52) U.S. Cl.
CPC ................ *A01C 1/06* (2013.01); *B01J 2/006* (2013.01)

(58) Field of Classification Search
CPC ..... A01C 1/06; B01J 2/10; B01J 19/18; B01J 2/006; B01F 27/091; B01F 27/60; B01F 27/63; B01F 25/104
See application file for complete search history.

(56) References Cited

U.S. PATENT DOCUMENTS 2,120,269 A * 6/1938 Sloan .................... B65D 90/12 222/185.1
3,168,796 A 2/1965 Scott
(Continued)

FOREIGN PATENT DOCUMENTS

CN 208908554 5/2019
CN 209134765 7/2019
(Continued)

OTHER PUBLICATIONS

Akyurek Technology, Batch Type Seed Coating Machine, available at least as early as Mar. 20, 2020, 4 pages.
(Continued)

*Primary Examiner* — Carly W. Lynch
(74) *Attorney, Agent, or Firm* — Robert A. Nissen

(57) ABSTRACT

Various batch mixers and related components and methods for coating seeds to be used in planting and other applications where it is desired to enhance germination of the seed or growth of the resulting plant. Seed supply systems include an articulating gate on a seed scale fill hopper. A lateral discharge gate on a seed supply hopper is provided. Unique mixing bars or blades are arranged around an interior of a stirring batch mixer. A discharge chute may be provided to dissipate kinetic energy of coated seeds without damaging the seeds.

19 Claims, 23 Drawing Sheets

(56) References Cited

U.S. PATENT DOCUMENTS 4,272,234 A * 6/1981 Tse .......................... C01B 17/10 425/222
4,507,335 A * 3/1985 Mathur .............. C01B 17/0237 425/222
4,549,620 A 10/1985 Dee
4,640,218 A * 2/1987 Motoyama ............... A23G 3/26 118/19
4,657,773 A * 4/1987 Mueller ................ B05B 3/1057 47/57.6
4,703,713 A 11/1987 Gago
4,724,794 A * 2/1988 Itoh ............................ B01J 8/44 118/DIG. 5
4,826,325 A 5/1989 Iwata
5,300,127 A 4/1994 Williams
5,443,637 A * 8/1995 Long, Jr. .................. B01J 2/006 118/313
5,501,874 A * 3/1996 Yamamoto ................. B01J 2/12 427/221
5,582,643 A 12/1996 Takei
5,586,411 A 12/1996 Gleddie
5,891,246 A 4/1999 Lund
6,354,728 B1 3/2002 Bretschneider
6,451,115 B1 * 9/2002 Wilson ..................... B01J 2/006 118/19
6,511,541 B2 * 1/2003 Pentecost ................. B01J 2/006 118/308
7,273,314 B1 9/2007 Whited
8,801,498 B2 * 8/2014 Hammond ............. B24B 31/16 451/32
10,099,186 B2 * 10/2018 Dunnebier .............. B01F 7/165
11,148,157 B2 * 10/2021 Gandolfi ................. B05C 13/00
2008/0241269 A1 * 10/2008 Velasquez .............. A01N 63/02 424/520
2013/0330155 A1 * 12/2013 Kaeb ........................ A01C 1/06 414/808
2014/0173979 A1 * 6/2014 Smith ...................... A01C 1/06 47/57.6
2018/0271004 A1 9/2018 Wenig
2019/0075712 A1 3/2019 Reineccius
2019/0133027 A1 * 5/2019 Herbster .................. A01C 1/08
2024/0349749 A1 * 10/2024 Kißwetter ................ A23G 1/16

FOREIGN PATENT DOCUMENTS

CN 209151520 7/2019
CN 209151521 7/2019
CN 209184970 8/2019
CN 209283682 8/2019
CN 209345522 9/2019
RU 2707641 11/2019

OTHER PUBLICATIONS

Gateway Building Systems Inc., Seed Treating Solutions Guide, available at least as early as Mar. 20, 2020, 16 pages.
JDA Progress, Linear Scale Filler, available at least as early as Mar. 21, 2020, 4 pages.
Pedrini et al., Seed coating: science or marketing spin?, Trends in Plant Science, Feb. 2017, 17 pages, vol. 22, issue 2.

* cited by examiner 10
42
32A
32E
16B
16A
17C
16
16K
14A
14M
32
32F
32B
14
22
14K
14B
38
30
12
12B
12G
30B-3
30B
30F
48D
44
34A
24
48A
48E
12L
40B
40
48C
26
48
34
12D
40A
34A
40L
36
32D 16A
42
16K
16
14A
17B-1
14M
16D
32F
32B
14
32
14K
14B
22
30A
12A
12E
15G
12F
30
36
12G
12
12B
48
48D
34A
34
44
48A
24
12D
26
34B
48C
40
40A
40A
40C
32D 10
42
32A
16A
32E
16
17C
14A
32B
14M
32
32F
14
14B
14K
22
36
12F
38
15G
12A
12E
30
30A
12
12B
12G
34A
48D
48
44
34
48A
26
48C
48E
12D
40
24
40B
40A
34B
40C
32D 10
42
16A
14A
32A
16B
16
32B 14B
14
14K
22
32F
32
12F
38
15G
12A
36
12E
12
12B
30
12G
34, 47
34, 47
24
48D
48A
48E
46
12D
48C
40
26
40B
40A
40C
34B
34

10
42
16A
16K
32A
16L
32E
16I
16B
16
14A
17A
14M
17D
14
32
14B
16D
22
14I
38
28E
15A
12A
15
20B
38B
12F
18B
12K
12B
11
28
12
30
30A
18
30E
20C
12E
12G
28
20
12I
12B-1
28E
14D
28F
20A
31C
31
12B-2
38A
18A
34
18D
13B
13C
46
30D
12D
13
34
48A
30F
50
46
13D
13A
48D
26
44
40B
48
24
40
48E
12L
32D
32G
40A
40C
34B 10
17C
42
16A
16K
32A
32E
16B
16J
16
16I
17E
14A
14M
17D
17A
32
14
32F
16D
14B
32B
14J
22
14I
18J, 20J
38
20C
12G
28F
11
12A
12E
15A
12B
15F
12F
30
15F
28
38B
28
28
15
28E
38A
28E
14D
18
12
12I
20B
20C
31
12B-1
20A
18A
31C
18B
18D
12J
20
28C
28I
12B-2
48A
13B
48D
13E
46
50
18E
13D
13A
30D
12D
34A
44
48E
12L
24
30F
40A
48
40
48C
26
40B
32D
34B
40C
32G
34

10
42
16A
16B
16
16K
32A
16J
16I
32E
14A
17A
17D
14M
17B-2
32B
16B
14
32F
14B
14J
32
22
38D
14I
11
28F
12K
38
28A
20C
12A
38E
12G
12E
15F
15A
12F
15
30
38R
28
28
14D
28C
38C
28E
29
12I
38A
20C
18
28
12
31C
54
20B
20A
31
52
20
28B
12B-1
28I
30D
18B
18D
20J
18J
12B-2
13
13B
13D
13E
50
18E
46
13A
48A
12L
12D
44
48D
34A
48
48E
24
40A
48C
26
40
32D
40B
34B
30F
40L
32G
34

16A
42
15
16K
16
16I
17B-1
15
17D 16B
42
16
16A
16K
17B-1
17A
17C 17D-1
17E
17E
17D
17G
17I
17I
16K
16
42
16A
16I
16B-1
16B, 16B-3
17D-1
16B-2
17B-1
17A
17G
16D
16M
17D-2
17D
17E
17C 16
42
16A
16K
16M 16B-3
16B
16B-1
17B-1
16B-2
17A-1
17I
17F
17A
17C
16C
16I
17
16D
17G
17D-1
17H
17E
17A-2
17D-2
17D
16
42
16A
16K
16M
17B-1
16B-1
16B-3
16B
17K
17F
17C
17A-1
16C
17I
17F
17A
17B-2
16I
17B-2
17G
17A-2
16D
17D-1
17E
17D
17H
17D-2
17D
17H 14M
14A
14I
15H
14K
14
14K
15H
14L 14A
14K
14K
14
15G
15G
15F
14D
15

14A
14K
14
15G
15F
15A-1
15
15A
14D
44
15A-2

14A
14K
14M
14
14J
14I
15H
14B
14K
15B
15C
15A-1
15D
15G
15E
15A
15F
15B
15
15A
15I
15A-2

14
15D
15F
14K
14K
14D
15
15A
15I 28C
28A
12I
28
12
18A
28F
12B
18
28I
18B
28B
28
12B-1
18D
12G
12B-2
31
12D
12
12B-1, 12B
18K
28
28H''
28F
28A
28C
12I 28
18J, 12J
28H'
28
28E
28G
29
31C
31
31B
12G
12
28K
29
28
12I
28F
28L
12B, 12B-1
28D
28E
28G 28
28A
32
28D
28I
28E
28F
28K
28B
28C
32

28
28A
28D
28I
28F
28E
28B
28C 28
28D
28I
28A
28B
28E
28C
28K
28F 28
28D
28A
28E
28I
28B
28C
28F

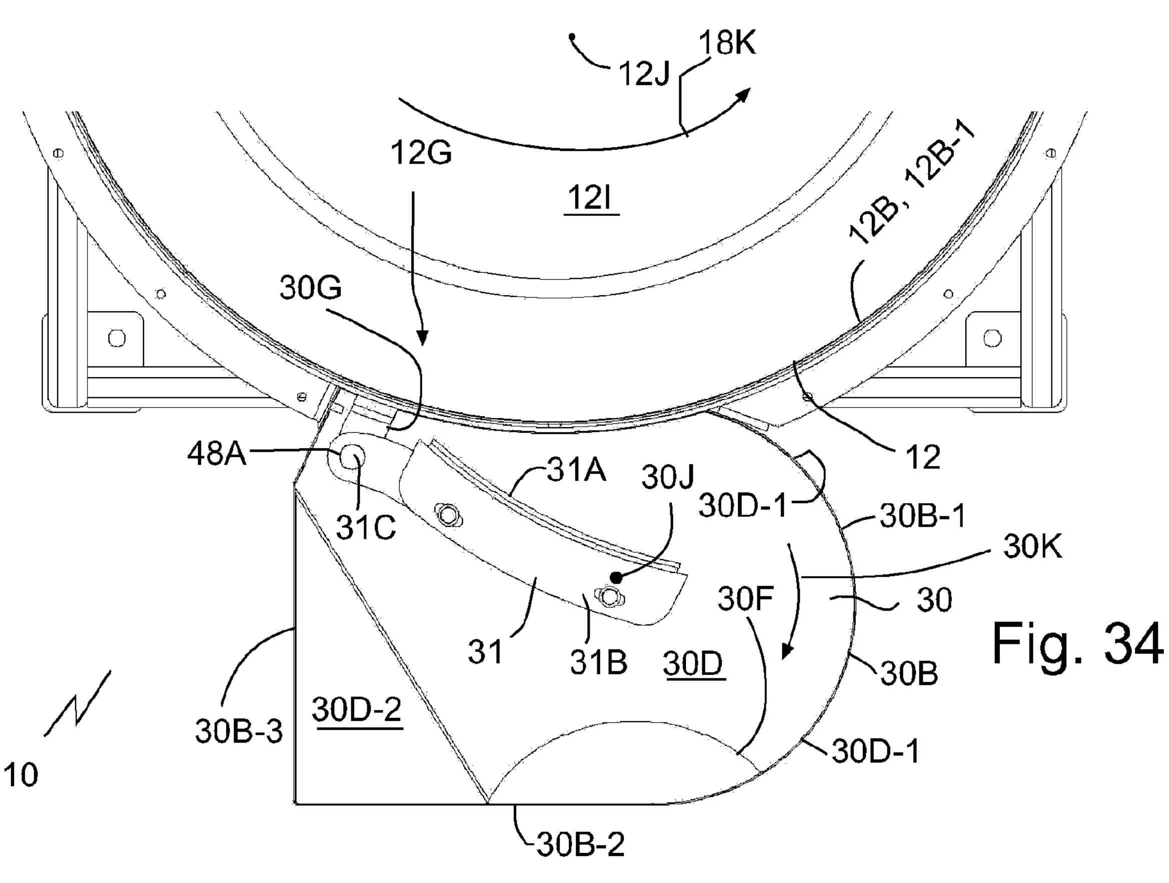
Fig. 34
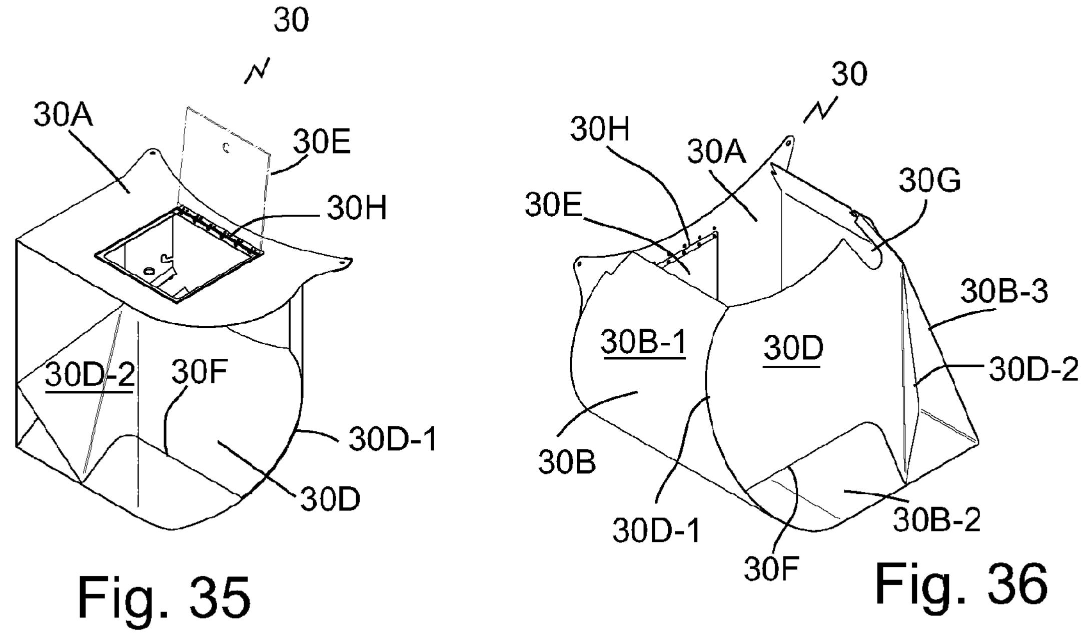
Fig. 35
Fig. 36

30
30E
30A
30B-3
30B-2
30D-1
30D-2
30D
30G
30B-1
30B
30F
30H
30
30E 30
30E
30H
30A
30B 30
30B-1
30G
30B-3
30D
30D-1
30F
30D-2
30B 30B-2
30
30A
30B
30B-2
30B-3
30B-1

30
30E
30A
30B-3
30B-2
30D-2
30D

BATCH SEED COATING DEVICES, SCALE FILLERS, MIXERS, DISCHARGE CHUTES AND GATES, AND RELATED SYSTEMS AND METHODS

TECHNICAL FIELD

This document relates batch seed coating devices, scale fillers, mixers, discharge chutes and gates, and related systems and methods.

BACKGROUND

The following paragraphs are not an admission that anything discussed in them is prior art or part of the knowledge of persons skilled in the art.

Batch seed coating mixers combine a mixture of liquid seed and dry coating with a batch of raw seeds together, to produce seeds that are coated with various components that can assist the seed in germination, seed flowability, fertilization, pest control or soil conditioning when planted in soil. A batch mixer might have a seed weigh bucket, a coating injector, a vertical mixing bowl, and some way of discharging coated seeds from the bowl.

SUMMARY

A batch seed coating device is disclosed comprising: a housing forming a seed mixing bowl; a stirring part mounted to stir, about a rotational axis, a mixture of seeds and seed coating within an interior of the seed mixing bowl; and a plurality of mixing blades angularly spaced around the interior of the seed mixing bowl with a leading face of each mixing blade angled radially inward along a direction of rotation about the rotational axis to in use direct the mixture radially inward.

A method is disclosed comprising: stirring a mixture of seeds and seed coating within an interior of a seed mixing bowl around a rotational axis of the seed mixing bowl; in which while stirring, a plurality of mixing blades, which are angularly spaced around the interior of the seed mixing bowl with a leading face of each mixing blade angled radially inward along a direction of rotation about the rotational axis, direct the mixture radially inward.

A batch seed coating device is disclosed comprising: a housing having a cylindrical side wall that forms a seed mixing bowl; a stirring part structured to in use rotate, in a direction of stirring rotation, about a rotational axis, a mixture of seeds and seed coating within an interior of the seed mixing bowl; a discharge chute mounted to an exterior of the cylindrical side wall at a discharge port in the cylindrical side wall, the discharge chute having an arcuate leading interior wall shaped to direct coated seeds, which are discharged into the discharge chute from the interior through the discharge port, to move radially outward in a chute rotational direction that is opposite to the direction of stirring rotation; and a discharge gate mounted to the discharge port.

A method is disclosed comprising: stirring a mixture of seeds and seed coating within an interior of a seed mixing bowl in a direction of stirring rotation around an axis of the seed mixing bowl; and discharging coated seeds from the seed mixing bowl through a discharge port in the cylindrical side wall into a discharge chute, the discharge chute having an arcuate leading interior wall shaped to direct coated seeds to move radially outward in a chute rotational direction that is opposite to the direction of stirring rotation.

A batch seed coating device is also disclosed comprising: a housing forming a seed mixing bowl; a stirring part mounted to stir, about a rotational axis, a mixture of seeds and seed coating within an interior of the seed mixing bowl; a discharge port in the cylindrical side wall; and a moveable mixing blade mounted to move within the interior of the seed mixing bowl between: a recirculating position where a leading face of the moveable mixing blade is angled to in use direct the mixture radially inward; and a discharge position where the leading face is angled to in use direct the mixture radially outward into the discharge port.

A method is also disclosed comprising: stirring a mixture of seeds and seed coating within an interior of a seed mixing bowl around a rotational axis of the seed mixing bowl, in which a moveable mixing blade, which is mounted within the interior of the seed mixing bowl, is positioned in a recirculating position with a leading face of the moveable mixing blade angled to direct the mixture radially inward; and discharging coated seeds from the seed mixing bowl through a discharge port in the cylindrical side wall, with the moveable mixing blade re-positioned in a discharge position such that the leading face is angled to direct the mixture radially outward into the discharge port.

A seed scale fill system is disclosed comprising: a fill hopper with a side wall and a seed discharge opening; and an articulating gate on the seed discharge opening of the fill hopper.

A method is disclosed comprising: supplying seeds into a fill hopper; manipulating an articulating gate of the fill hopper into an open position to pour the seeds into a weigh hopper; manipulating the articulating gate into a trickle position to meter seeds into the weigh bucket; and closing the articulating gate when the weigh bucket is at a predetermined fill level. The seed may be introduced into the hopper in a way so that there is minimal mechanical impact to the seed by causing the initial seed to travel down the side of weigh hopper.

In various embodiments, there may be included any one or more of the following features: The leading face of each mixing blade is oriented to form an obtuse angle with a circumference of rotation defined about the rotational axis. The housing comprises a cylindrical side wall, and the plurality of mixing blades are mounted to interior surfaces of the cylindrical side wall. Each mixing blade is tapered with increasing distance from the cylindrical side wall in a direction toward a top of the seed mixing bowl. The stirring part comprises a rotary table. The rotary table forms an inner bowl that nests within the seed mixing bowl. A seed coating injector. The seed coating injector comprises a plurality of nozzles directed toward a rotary disc located coaxial with the rotational axis. Each mixing blade has an anchor arm extended from a rear face of the mixing blade, the anchor arm secured to a side wall of the interior of the seed mixing bowl. A seed supply hopper. The seed supply hopper comprises a discharge gate forming a scoop that is structured to swing down from an open base end of the seed supply hopper to direct seeds toward a side of the seed mixing bowl. The seed supply hopper is oriented to supply seeds through a roof of the housing into the interior. The seed supply hopper comprises a weigh bucket. The housing has a cylindrical side wall, and further comprising a discharge chute mounted to an exterior of the cylindrical side wall at a discharge port in the cylindrical side wall, the discharge chute having an arcuate leading interior wall shaped to direct coated seeds, which are discharged into the discharge chute from the interior through the discharge port, to move radially outward in a chute rotational direction that is opposite to the direction of rotation. A moveable mixing blade is mounted to move within an interior of the seed mixing bowl between: a recirculating position where a leading face of the moveable mixing blade is angled to in use direct the mixture radially inward; and a discharge position where the leading face is angled to in use direct the mixture radially outward into the discharge port. Rotating a rotary table that is nested within the seed mixing bowl. Injecting seed coating into the seed mixing bowl. Supplying seeds into the seed mixing bowl from a weigh bucket. Discharging coated seeds from the seed mixing bowl. When in the recirculating position, the leading face is angled radially inward along a direction of rotation about the rotational axis. When in the recirculating position, the leading face of the moveable mixing blade is oriented to form an obtuse angle with a circumference of rotation defined about the rotational axis. When in the discharge position, the leading face of the mixing blade is angled radially outward along a direction of rotation about the rotational axis. The mixing blade is mounted to the cylindrical side wall. The mixing blade is mounted to rotate about a blade axis that is perpendicular to the rotational axis and defined within the interior. A blade actuator mounted to move the moveable mixing blade between the discharge position and the recirculating position. The blade actuator comprises a linear actuator and a crank arm mounted to rotate the moveable mixing blade about a shaft. The moveable mixing blade is mounted at a downstream end of the discharge port. A discharge gate mounted to the discharge port. A discharge chute mounted to an exterior of the cylindrical side wall at the discharge port. Re-positioning the moveable mixing blade from the recirculating position to the discharge position. Re-positioning comprises rotating the moveable mixing blade about a blade axis that is both parallel to the rotational axis and defined within the interior. The mixing blade is mounted at a downstream end of the discharge port. Discharging further comprises opening a discharge gate at the discharge port. Re-positioning the moveable mixing blade from the discharge position into the recirculating position. An interior surface of the discharge gate is arcuate to follow a cylindrical shape of an interior surface of the cylindrical side wall. A base of the discharge chute is sloped downward moving radially outward from the cylindrical side wall. The discharge chute defines a seed exit opening in a base of the discharge chute. A rear portion, opposite the arcuate leading interior wall, of a base of the discharge chute is sloped downward moving toward the arcuate leading interior wall. A top hatch in a roof of the discharge chute. An actuator connected to move the discharge gate between an open and closed position. The seed coating injector comprises a plurality of nozzles directed toward a rotary disc located coaxial with the rotational axis. A plurality of mixing blades angularly spaced around the interior of the seed mixing bowl with a leading face of each mixing blade angled radially inward along the direction of stirring rotation about the rotational axis to in use direct the mixture radially inward. The articulating gate is movable between: a closed position; an open position; and a trickle position. The articulating gate comprises: a first flap pivotally connected to the fill hopper; and a second flap pivotally connected to the first flap. The open position is defined when the first flap is open; the trickle position is defined when the first flap is closed but the second flap is open; and the closed position is defined when the first flap and the second flap are closed. The seed discharge opening is defined in a base of the fill hopper; the first flap is connected to swing down and up below the seed discharge opening to converge with and diverge from, respectively, the open base end. The second flap is connected to swing down and up relative to the first flap. Plural pivot axes, defined between: a) the first flap and the fill hopper and b) the first flap and the second flap, are one or both parallel and horizontal. The second flap is pivotally connected at a flap end, of the first flap, with the flap end being opposed to a mounting end where the first flap pivotally connects to the fill hopper. The side wall of the fill hopper comprises first and second walls opposed to one another with third and fourth walls opposed to one another between the first and second walls; the first flap is pivotally connected to the first wall; and when the first flap is in a converged position, the first flap blocks the seed discharge opening except for a seed trickle gap defined between the seed discharge opening and the first flap. The seed trickle gap is defined between the second wall and the flap end and structured to permit lateral movement of the seeds through the seed discharge opening below the second wall when the second flap is open. When closed, the first flap forms a seed ramp that is sloped downward toward the flap end of the first flap. Base edges of the third and fourth walls are tapered downward toward the second wall. When the first flap is in the converged position, the second flap is movable between: open where the second flap permits the discharge of seeds; and closed where the second flap is sloped upward away from the flap end of the first flap to block the discharge of seeds. The seed trickle gap is defined between the second wall and the flap end. The first flap forms a scoop with a base and upright side walls. The second flap forms a scoop with a base and upright side walls. One or more actuators connected to pivot the first flap relative to the fill hopper and the second flap relative to the first flap. When in the closed position the articulating gate has sufficient clearance between the fill hopper to avoid pinch points. A weigh bucket connected to receive seeds from the seed discharge opening. A weight sensor on the weigh bucket. A controller to operate the articulating gate and receive signals from the weight sensor. The controller is configured to operate the articulated gate to fill the weigh bucket to a predetermined seed fill level by: moving the articulated gate into an open position to fill the weigh bucket with seeds from the fill hopper; and when the weigh bucket is between an intermediate seed fill level and the predetermined seed fill level, moving the articulated gate into a trickle position. The controller is configured to operate the articulated gate by, when the weigh bucket is at or near the predetermined seed fill level, moving the articulated gate into the closed position. The weigh bucket forms a hopper with a discharge gate structured to direct discharged seeds laterally out of the weigh bucket. The discharge gate is structured to swing down and up relative to an open base end of the weigh bucket.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 34 is a view taken along the 34-34 section lines of FIG. 6, illustrating the discharge gate and discharge chute.

FIG. 35 is a perspective view of the discharge chute of the batch seed coating device of FIG. 1, with the top hatch gate opened, and the side wall removed to illustrate the interior of the discharge chute.

FIG. 36 is a perspective view of the discharge chute of the batch seed coating device of FIG. 1 on its side so the bottom of the chute is seen.

DETAILED DESCRIPTION

Figure 1:
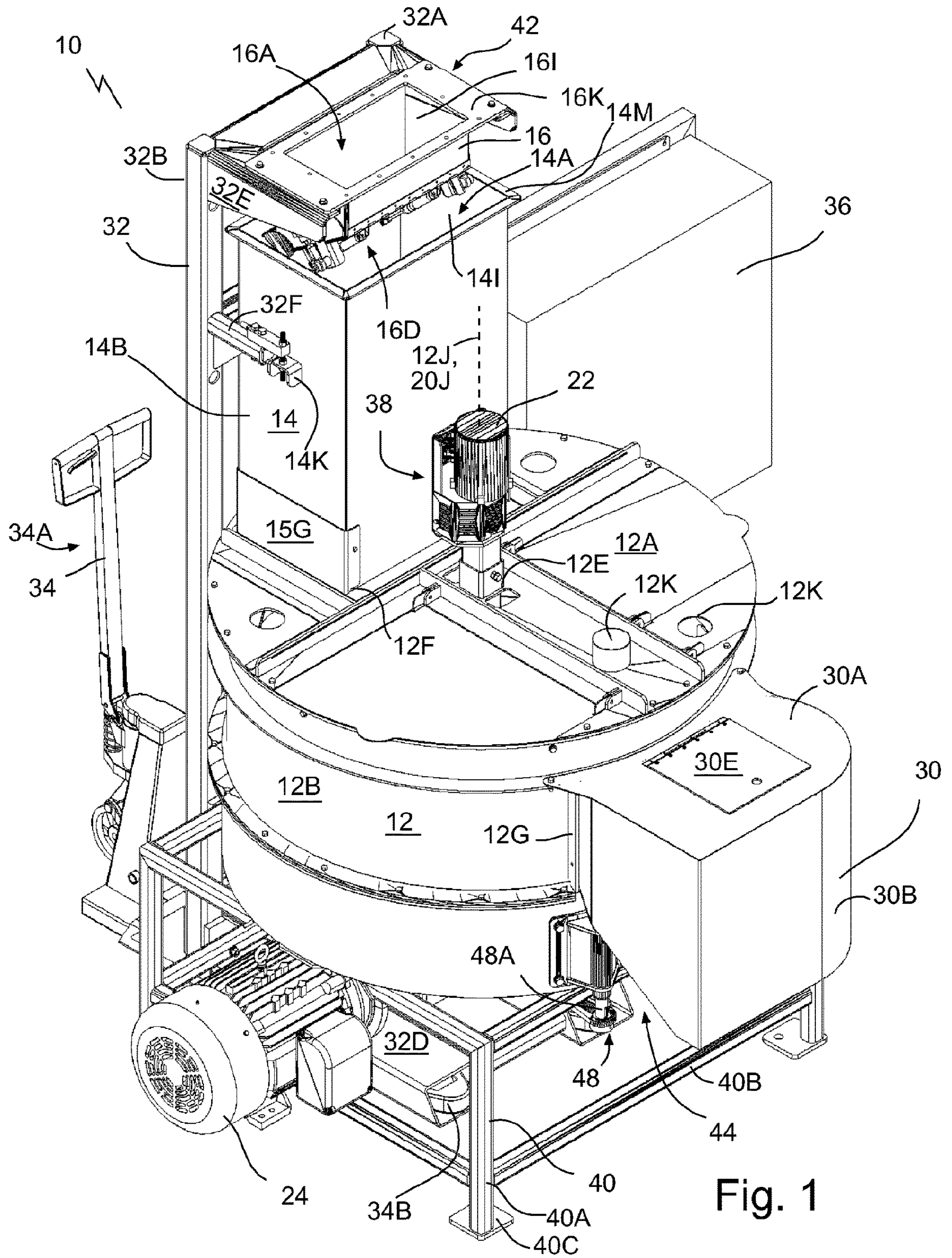
FIG. 1 is a perspective view of a batch seed coating device, having a seed scale fill system, a mixing drum, a controller, a seed coating injector, and a discharge chute.
Figure 2:
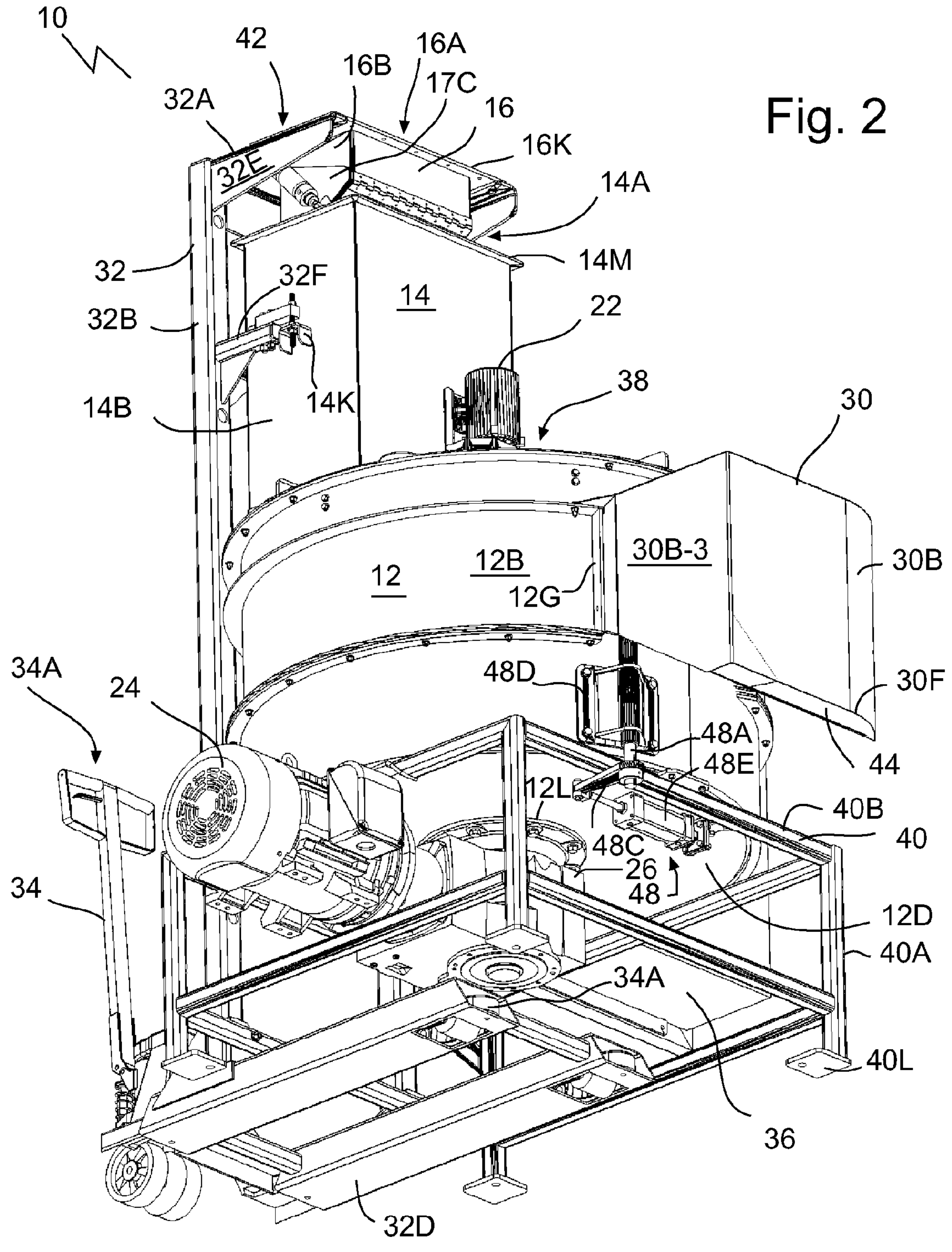
FIG. 2 is a bottom perspective view of the batch seed coating device of FIG. 1.

Immaterial modifications may be made to the embodiments described here without departing from what is covered by the claims.

A seed includes an embryonic plant enclosed in a protective outer covering. The formation of the seed is part of the process of reproduction in seed plants. Seed plants dominate biological niches on land, from forests to grasslands both in hot and cold climates. Seeds are also used in agriculture, to plant various crops in open fields. The term seed also has a general meaning that antedates the above—anything that can be sown, e.g. "seed" potatoes, "seeds" of corn or sunflower "seeds". In the case of sunflower and corn "seeds", what is sown is the seed enclosed in a shell or husk, whereas the potato is a tuber. Many structures commonly referred to as "seeds" are actually dry fruits. Plants producing berries are called baccate Sunflower seeds are sometimes sold commercially while still enclosed within the hard wall of the fruit, which must be split open to reach the seed. Different groups of plants have other modifications, the so-called stone fruits (such as the peach) have a hardened fruit layer (the endocarp) fused to and surrounding the actual seed. Nuts are the one-seeded, hard-shelled fruit of some plants with an indehiscent seed, such as an acorn or hazelnut.

Seed germination and subsequent plant growth may be stimulated in various ways. Plants may be inoculated in a variety of ways, including indirect methods and direct methods. Indirect methods include mixing the inoculant into planting and germination mixtures or seed priming media, or applying the inoculant to aboveground portions of plants. Direct methods include inoculating the seeds—coating seeds of the plant with an inoculant or inoculants. Direct application of active ingredients to seeds may allow for a reduction, relative to indirect application, in the amount of treatment composition that would otherwise be required to be applied to soil after or during planting. Post or pre-planting soil treatment applications (indirect methods) may have disadvantages relative to seed coating (direct methods). Soil treatments may not penetrate the soil to a sufficient level or location where such may be effective, and such may be whether dependent, and otherwise not as economical as direct seed application (seed coating).

In some cases, inoculants or other active agents may be mixed in downstream or upstream methods. On-farm or on-site downstream methods may involve the farmer or gardener mixing the inoculant and the seed together by hand or batch mixing before or during seed loading into the planting equipment. Alternatively, pre-inoculation upstream techniques may be used where the seeds are prepared by a manufacturer or other upstream party.

Seed inoculation—also known as seed coating—is a technique used to as an aid to improve one or more of seed appearance, handling characteristics, active compound delivery, and germination. Seed coating includes the application of ingredients such as a binder (such as an adhesive polymeric liquid), filler or carrier medium (for example a powder), and active ingredient or active ingredients (sometimes called inoculants, for example beneficial microorganisms). In some cases, one or more of the binder, filler, and active ingredient function as two or more of the binder, filler, and active ingredient. Active ingredients may include, but are not limited to, fertilizers, fungicides, nutritional elements, moisture agents, plant growth regulators, and pesticides, which are applied onto the exterior surface of the seeds. Seed coating may improve stress resistance, improve disease resistance, accelerate germination, promote seedling formation, and otherwise increase yield and improve crop quality. Once seeds are sown into the soil, the agents that coat the seeds may absorb water and release, providing the seeds with a good germination environment and suitable seedling growth conditions. Some coatings may be selected to have a controlled release effect, to release slowly over time to provide the seed with a steady supply of the active ingredient(s) present in the coating as needed by the seed.

Seed coating may provide a film coating on the seeds, along with a filler such as a powder that contains the desired active agent or agents. In some cases, the filler/powder containing active agents may be mixed prior to application to ensure proper mixing with the binder, and thus even application of the agents. In some cases, the binder is applied first to the seed exterior, followed by application of the active agent and any filler thereafter to the wet coating around the seed. In some cases, an assembly line application, manual application, or cyclic oscillatory device may be used for coating application.

A seed coating machine may be used to apply the seed coating. Various machines for treatment of seeds in batch or continuous treatment mode are known. An efficient method of batch treatment may include a device that calculates the amount of treatment dispersed using the relative flow rate of the seeds or batch size of seeds through the machine. Some batch methods include a stir-pot application. In some cases of batch mixing, a device may use a barrel or drum in which seeds and a coating is applied, with some form of rotating arm to stir or mix the solution with the seeds, and/or the device itself may oscillate or rotate to ensure uniform coating. Coating applications may also be carried out via a continuous process, such as via a conveyor belt application or a spray unit application. In some cases what is termed a continuous batch mixing method is used, where a batch mixing technique is leveraged to produce a relatively continuous flow of coated seeds, albeit in a series of batches.

Figure 7:
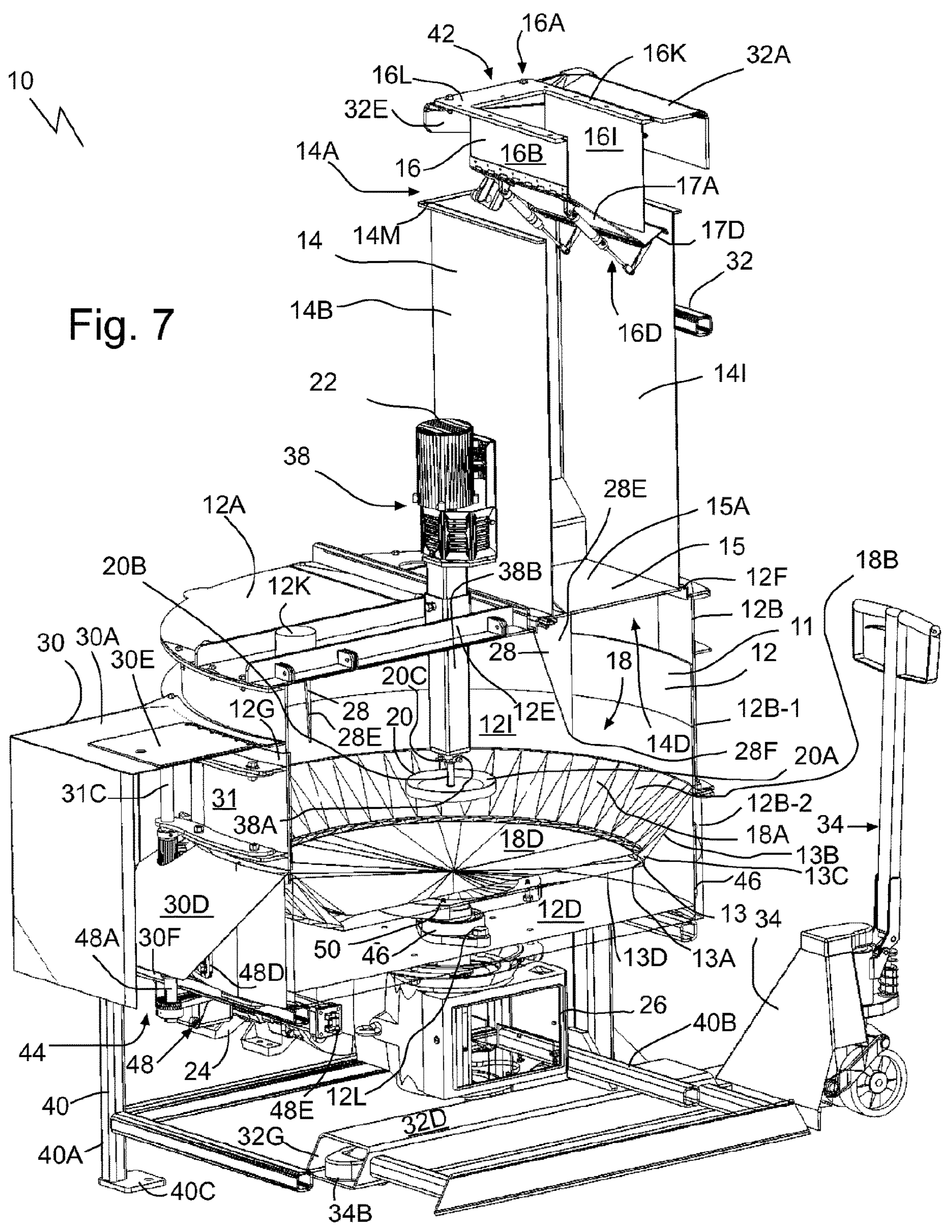
FIG. 7 is a perspective view taken along the 7-7 section lines of FIG. 3.
Figure 8:
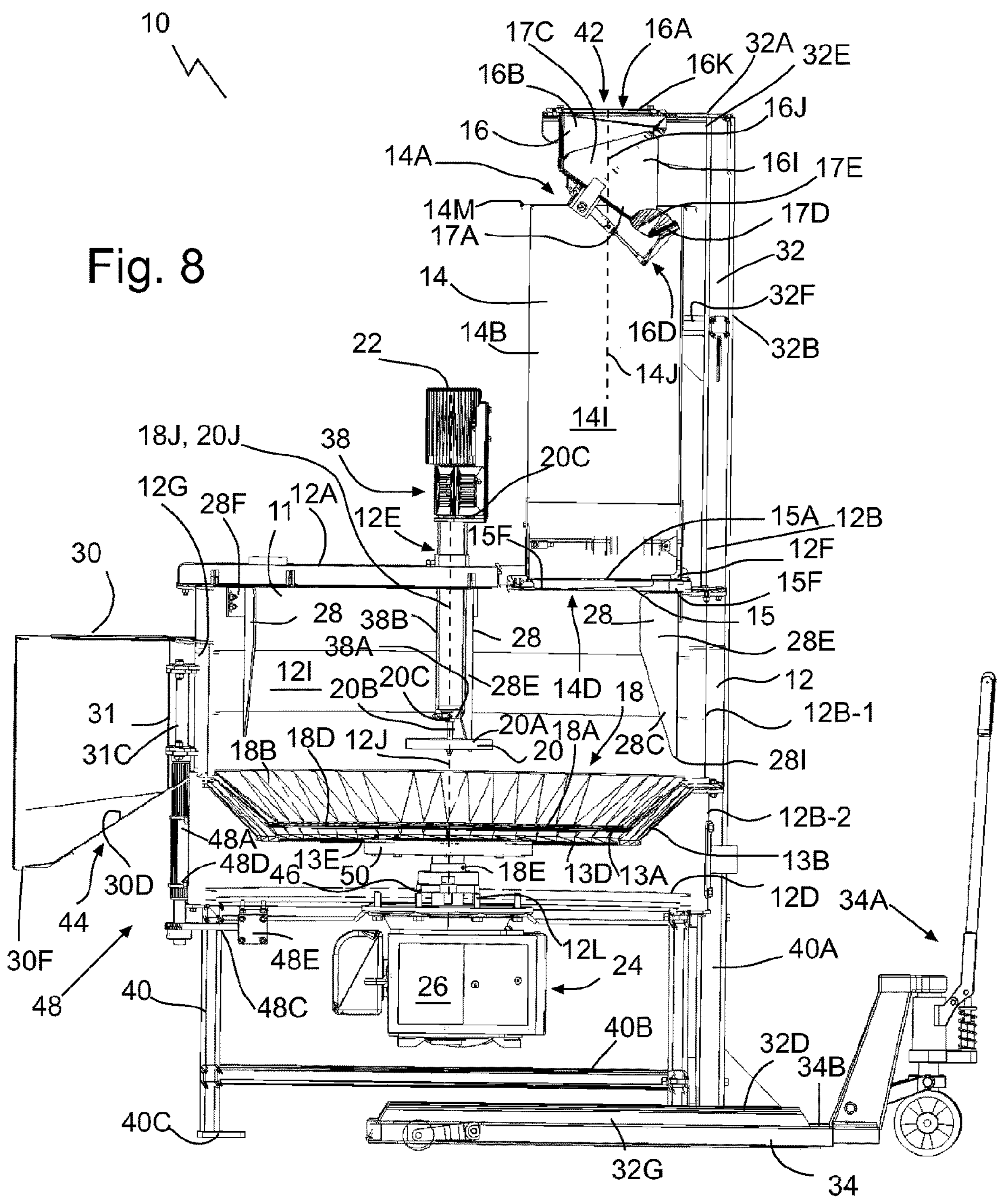
FIG. 8 is a side view taken along the 8-8 section lines of FIG. 3.
Figure 9:
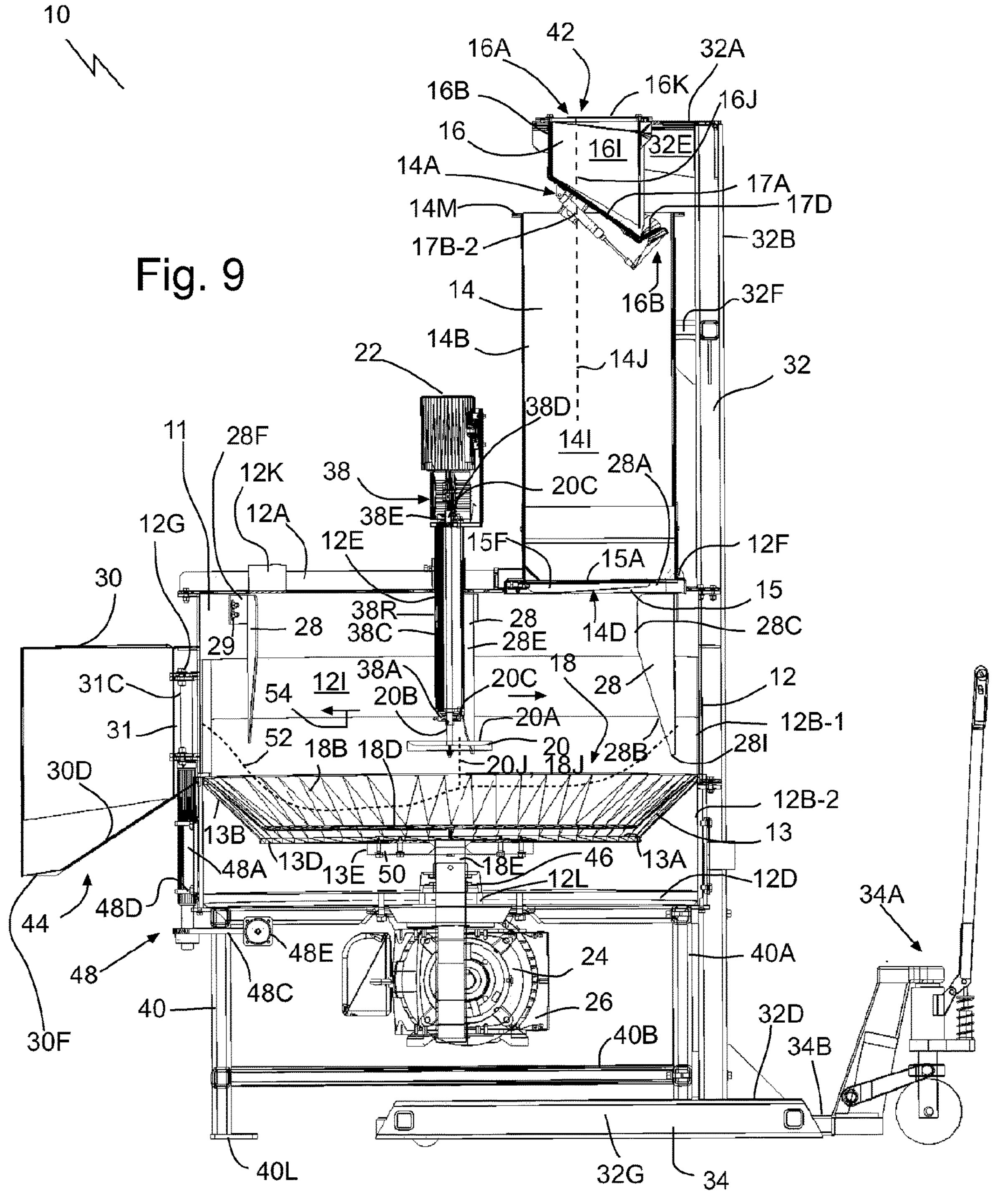
FIG. 9 is a perspective view taken along the 9-9 section lines of FIG. 3.
Figure 10:
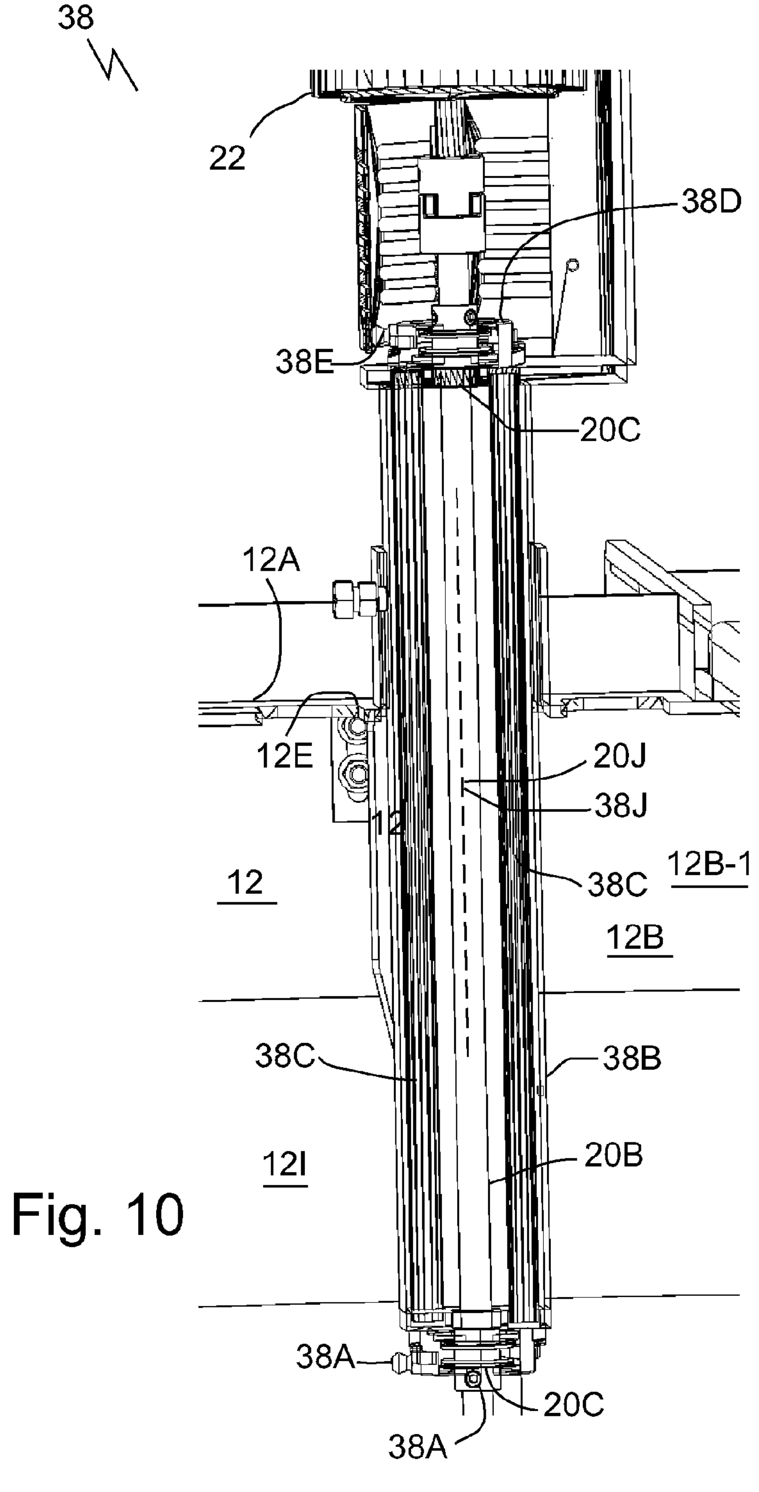
FIG. 10 is a close-up view taken along the 10-10 section lines of FIG. 3.
Figures 11, 12, 13:
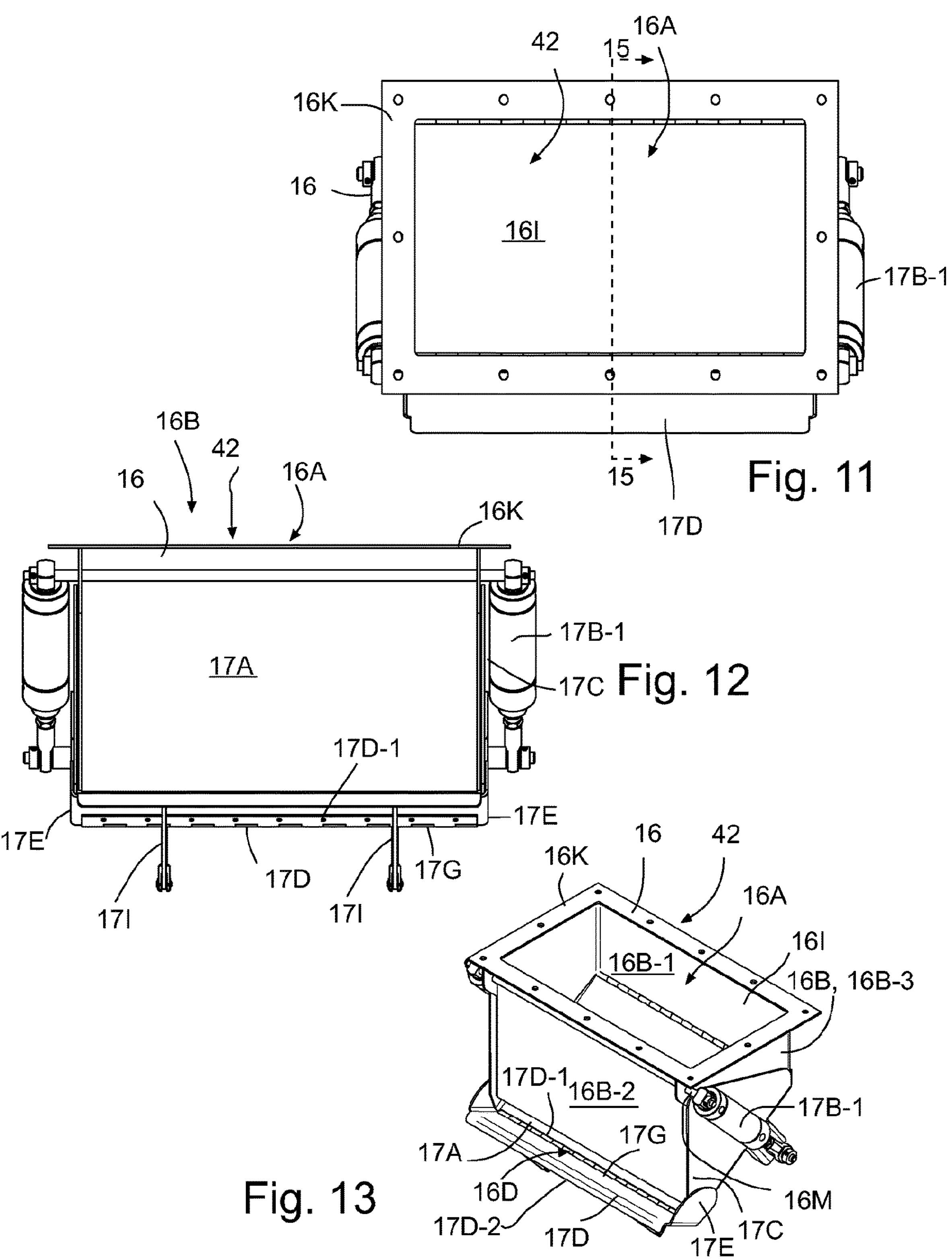
FIG. 11 is a top plan view of a fill hopper of the seed scale fill system of FIG. 1.
FIG. 12 is a rear view of the fill hopper of FIG. 11.
FIG. 13 is a perspective view of the fill hopper of FIG. 11.

Referring to FIGS. 1-9, a batch seed coating device 10 is illustrated. The device 10 may comprise a part that dispenses seeds, a part that dispenses seed coating, a part that mixes the seeds and seed coating, and a part that discharges the coated seeds, although some embodiments disclosed herein may have one or more of the foregoing parts. Referring to FIGS. 7-9, the device 10 may comprise a housing 12, such as a drum as shown, that forms a seed mixing bowl 11. Referring to FIGS. 8 and 9, a stirring part, such as a mixing table 18, may be mounted to stir, about a rotational axis 18J (Figs. Referring to FIG. 28, in use the mixture of seeds 52 and seed coating 54 may be mixed within the interior 12I in a direction 18K of stirring rotation around the rotational axis 18J. A controller 36 may be connected to operate any one or more aspects of the device 10 or subsystems.

Referring to FIGS. 1-9 and 27-28, the housing 12 may have suitable characteristics. In the example shown a vertical mixing drum is shown, although horizontal, tilted (such as similar to a concrete mixer), and other drum orientations may be used. The housing 12 may have a cylindrical side wall 12B, although in other cases two, three, four or more walls may be used, in addition to other more complex shapes. The housing 12 may be open topped or may have a top wall or roof 12A. The housing 12 may be open bottomed or may have a base 12D. The cylindrical side wall 12B may define a central axis 12J, which in the example shown is coaxial with the axis 18J.

Referring to FIGS. 7-9, the housing 12 may have a suitable stirring part. In the example shown a rotary mixing table 18 is present in interior 12I. The rotary table 18 may form an inner bowl that nests within the seed mixing bowl 11, for example that nests within a catch basin 13. Basin 13 may be nested within and anchored to interior surfaces of the side wall 12B above the base 12D within interior 12I. A power source may be provided to rotate the stirring part, for example a motor 24 with a suitable power transfer such as a gearbox or transmission 26 may be provided to turn table 18. Table 18 may be mounted for rotation within the housing 12, for example a drive shaft 18E of table 18 may be mounted one or more bearings such as bearings 46 and 50 in base 12D and basin 13, respectively. The basin 13 may have tapered side walls 13B, which may be sloped down toward a base 13D with decreasing radial distance from side wall 12B. The table 18 may be mounted over or on a top surface 13A of basin 13. The table 18 may have tapered side walls 18B, which may be sloped down toward a base 18D with decreasing radial distance from side wall 12B. A top bowl surface 18A may be defined on the table 18, for conveying seeds 52 and seed coating 54 to rotate within the housing 12. The stirring part may comprise various flutes or paddles or blades, to convey rotational motion. The stirring part may comprise various arms or other parts to achieve its function.

Figures 27, 28, 29:
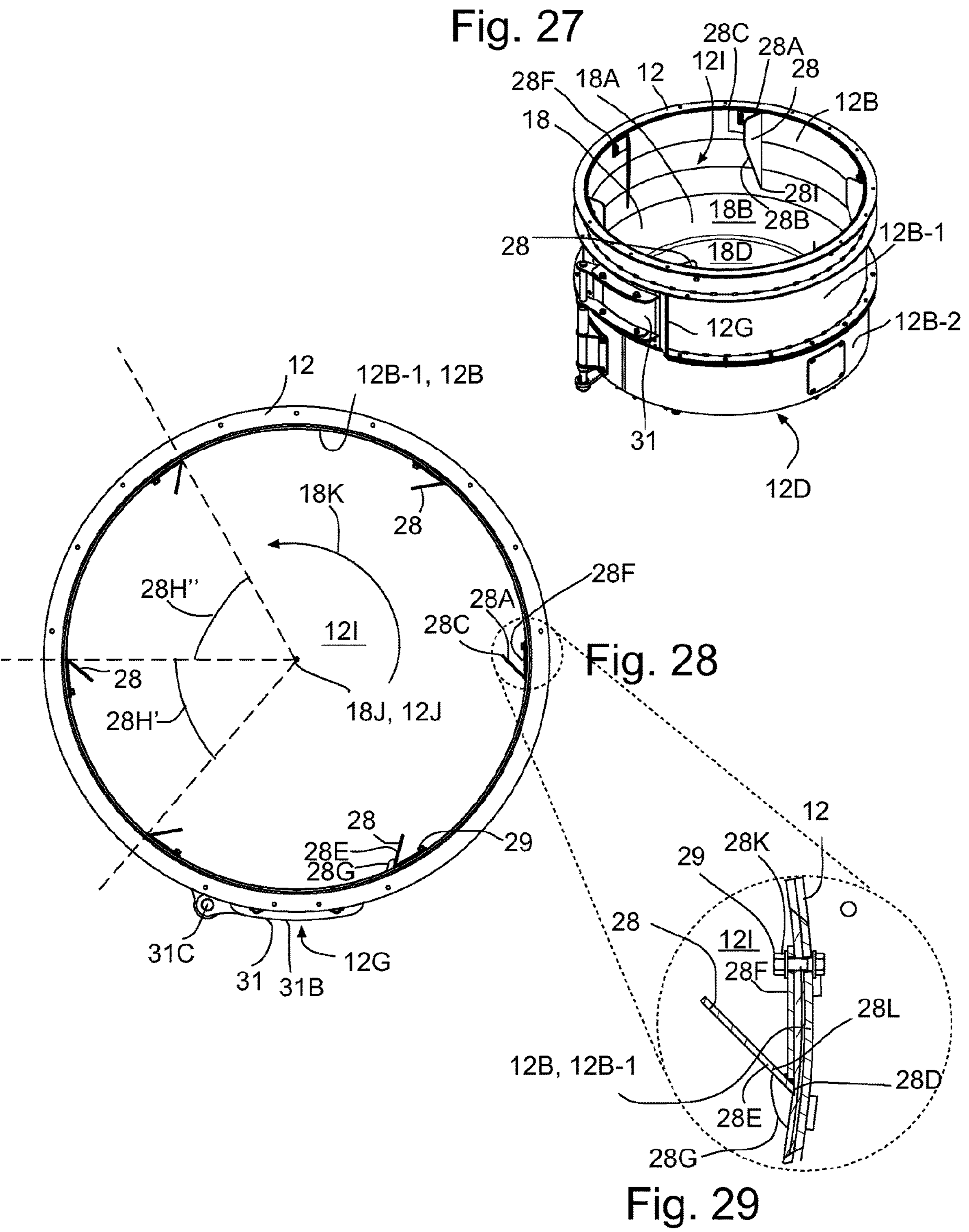
FIG. 27 is a perspective view of a mixing bowl drum of the batch seed coating device of FIG. 1, with a roof of the mixing bowl removed to illustrate the plurality of mixing blades.
FIG. 28 is a top plan view of the mixing bowl drum of FIG. 27.
FIG. 29 is a close-up view of the area denoted by dashed lines in FIG. 28.
Figures 30, 30A, 31, 31A:
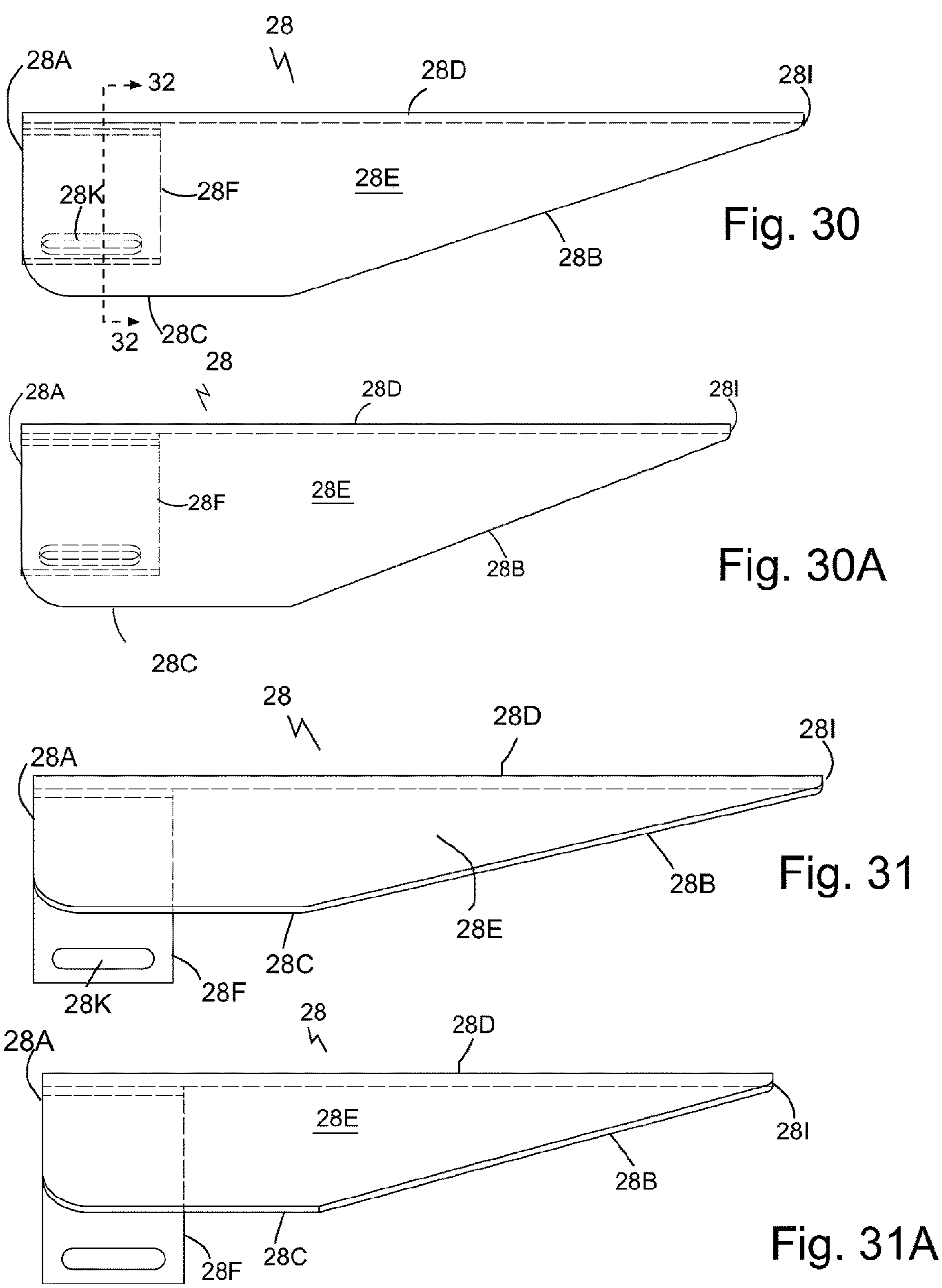
FIG. 30 is a front elevation view of a mixing blade from the mixing bowl drum of FIG. 27, with an anchor plate shown in dashed lines.
FIG. 30A is a front elevation view of another embodiment of a mixing blade, which is longer than the embodiment of FIG. 30.
FIG. 31 is another front elevation view of the mixing blade of FIG. 30, from a different angle, with the anchor plate shown in dashed lines.
FIG. 31A is another front elevation view of the mixing blade of FIG. 30A, from a different angle, with the anchor plate shown in dashed lines.
Figure 32:
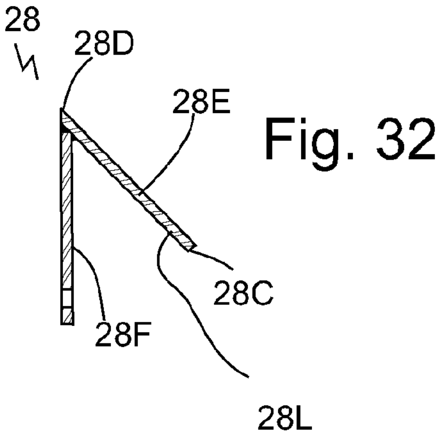
FIG. 32 is a cross-sectional view of the mixing blade from FIG. 30.
Figure 33:
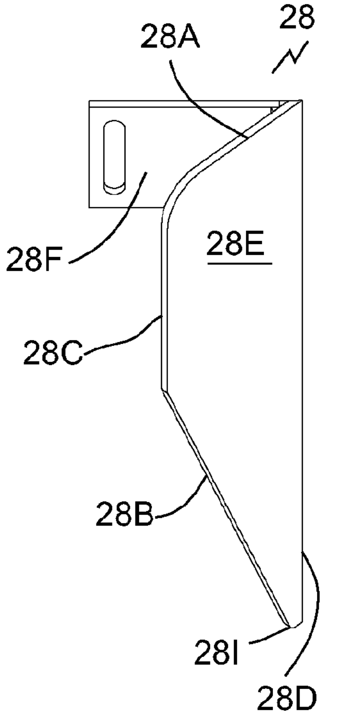
FIG. 33 is a perspective view of the mixing blade of FIG. 30.

Referring to FIGS. 7-9 and 27-29, the housing 12 may incorporate a plurality of mixing blades 28 to facilitate mixing within interior 12I. Referring to FIG. 28, the plurality of mixing blades 28 may be angularly spaced around the interior 12I of the housing 12, for example at relative angles 28H' and 28H" defined about axis 12J of the housing 12. A leading face 28E of each mixing blade 28 may be angled inward to direct the mixture, for example slurry, radially inward. By directing the mixture radially inward as the mixture rotates (for example under the compulsion of a stirring part such as table 18), the mixture remains dynamic with seeds moving over seeds and contacting seed coating for efficient coating application. The leading faces 28E may be angled radially inward (toward the center axis 12J) along a direction 18K of rotation about the rotational axis (12J or 18J) to in use direct the mixture radially inward. Relative to a system that incorporates blades 28 mounted radially (ninety degrees relative to side wall 12B), blades 28 that define the relatively softer angles shown may reduce back pressure in the stirring mixture, which may reduce damage to the seeds. Referring to FIGS. 28 and 29, the angles 28G defined may be obtuse angles when measured from a theoretical circumference of rotation (for example shown by the interior surfaces of the side wall 12B) defined about the rotational axis 12J. The leading face 28E is understood as the face that faces or leads into the flow of the mixture about the direction of rotation.

Referring to FIGS. 27-33, the blades 28 may incorporate suitable characteristics. In some cases, the blades 28 are made of rigid material, such as metal, while in other cases the blades 28 may be formed of flexible or resilient material such as polymeric materials. The mixing blades 28 may have a suitable shape. For example, the blades 28 may be tapered with increasing distance from the cylindrical side wall 12B in a direction toward a top wall or roof 12A (not shown) of the housing 12. To illustrate the tapering, the images shown a blade 28 that has a tapered base edge 28B that extends from a base end 28I toward a top end 28A. An inner edge 28C with a relatively non-tapered zone may be present, for example between the edge 28B and top end 28A. The corners between adjacent edges may be beveled as shown, for example to reduce the potential for damage to the seeds during use.

Referring to FIGS. 27-33, the blades 28 may anchor to the interior surfaces of the side wall 12B of housing 12, for example using anchors, such as anchor plates or arms 28F. Each anchor arm 28F may be extended from a rear face 28L or outer edge 28D of the mixing blade 28. The anchor arms 28F may be secured to a side wall 12B of the interior of the seed mixing bowl, by a suitable mechanism such as by fasteners 29 passed through respective slots 28 in each bar or blade 28. The anchor arms 28F may be arcuate or planar, or other suitable shapes.

Referring to FIGS. 30-31 and 30A-31A, different configurations of blades 28 may be used. Different sizes and shapes of blades 28 may be used. The blades of FIGS. 30A and 31A may be shorter than the blades 28 of FIGS. 30 and 31. In some cases blades 28 of relatively different lengths and dimensions are used in the same device 10, as such may increase the efficiency of the mixing process. Referring to FIG. 8, different relative angular spacings may be used, leading to relative angles 28H' and 28H" that differ from one another in the same housing 12. Different angles 28G of advancement may be used among blades 28 in the same housing 12. Differences in angles, shape, and position may increase efficiency of the mixing process. Referring to FIGS. 7-9 and 27, each blade 28 may be mounted at a suitable location within interior 12I of housing 12. For example, each blade 28 shown is mounted so that the base end 28I is above the table 18, as well as above the tapered side walls 13B and 18B of the basin 13 and table 18, respectively. In some cases, the blades 28 may reduce mixing time relative to a process that does not incorporate blades 28 or incorporates radially oriented blades 28. In some cases, mixing times may be cut in half or more. A reduction in residence time within the housing 12 while being stirred puts less force on the seeds, reducing the potential for seed damage. Often times when a seed is damaged it will be useless, such as is the case with raw peanuts that break in half. A reduction in mixing speed and stirring time also reduces power requirements.

Referring to FIGS. 1-9, the device 10 may have a suitable system for supplying seeds to the housing 12. In a batch treatment the amount of seed treatment provided to seeds may be determined by the weight of seeds, for example, X volume of treatment fluid for Y weight of seeds. A useful measurement to determine the amount of treatment required, as well as controlling the rate of coating, may be based on a calculation or estimation of the total surface area of the seeds. In some cases, one or more of volume, weight, seed counting, or other suitable methods may be used to measure out a sufficient charge (predetermined level) of seeds to supply to the housing 12. The weight of the seeds may vary with humidity and other factors whereas the volume of seed correlates more directly with the surface area of the seed. In some cases, a seed supply system such as incorporating hopper 14 may dispense plural charges into the housing 12 during a coating process or prior to a coating process to make up a sufficient seed level in the housing 12 for a coating process.

Referring to FIGS. 1-9, in the example shown, a weigh bucket, such as a scale hopper 14 may be provided. A weigh bucket may incorporate a weight sensor to assist in measuring a predetermined charge of seeds to dispense into the housing 12. Referring to FIGS. 21-26, a weight sensor may incorporate a pressure transducer or other sensor, for example on or in or associated with an actuator 15B that operates a seed discharge gate assembly 15.

Referring to FIGS. 1-9, in use, the seed mixing bowl (housing 12) may be connected to receive seed from the weigh bucket. The scale hopper 14 may be suspended above the housing 12, or otherwise in a position where seed may be dispensed from the hopper 14 into the housing 12, such as via a conduit (not shown). In the example shown the scale hopper 14 mates with the roof 12A of housing 12 to provide the hopper 14 with direct access to the interior 12I of housing 12. The hopper 14 may secure, for example by fasteners or welding or other suitable mechanisms, to roof 12A.

Referring to FIGS. 9 and 21-26, the hopper 14 (weigh bucket) may have suitable parts: the hopper 14 may have one or more side wall, such as four side walls 14B as shown. The hopper 14 may have a suitable shape, such as a rectangular box, although other shapes may be used such as that of a cylinder, or a structure whose cross-section is that of a polygon, a triangle, or a trapezoid. The hopper 14 may be structured to receive seed from a seed supply source, for example via one or more openings, such as an open top end 14A. In other cases, the top of the hopper 14 may be closed or have a gate over the opening. The hopper 14 may form a duct that conveys seeds from a seed supply source to the housing 12, for example through an interior 14I along a path defined by a hopper axis 14J. A peripheral flange 14M may line top end 14A, for example for reinforcement or other purposes.

Figure 26:
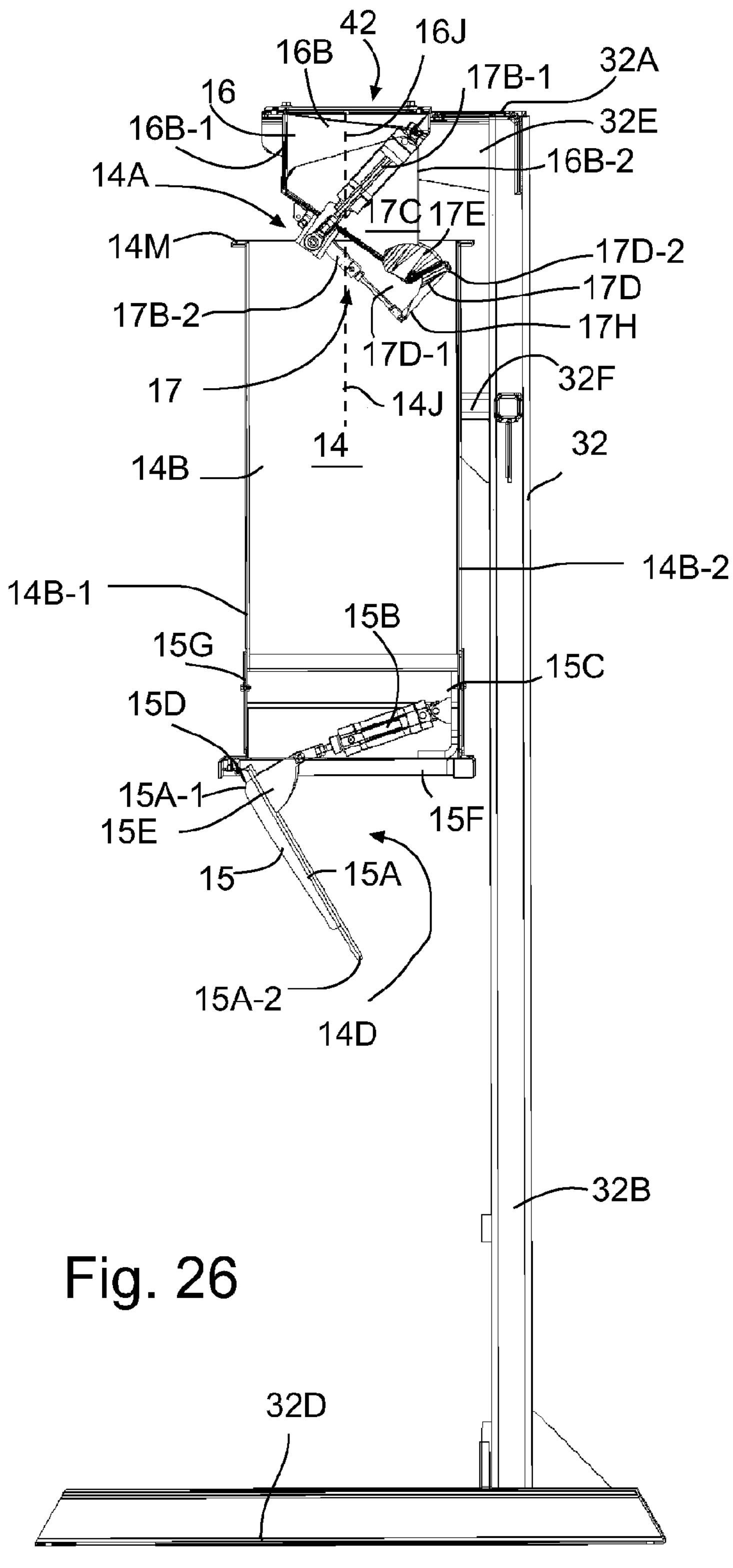
FIG. 26 is a view taken along the 26-26 section lines of FIG. 3, illustrating only the seed scale fill system of FIG. 1, with the fill hopper in the closed position and the weigh bucket hopper in an open position.

Referring to FIGS. 9 and 21-26, a suitable mechanism may be provided for discharging seeds from the weigh bucket hopper 14 into the mixing bowl housing 12. A discharge gate 15A may be provided for such a purpose. Referring to FIGS. 9 and 26, the discharge gate 15A may be structured to swing down and up relative to an open base end 14D of the weigh bucket hopper 14. FIG. 9 illustrates a closed position where the gate 15A is swung up, for example to converge with a base flange 15F of the assembly 15. By contrast, FIG. 26 illustrates an open position where the gate 15A is swung down, for example to diverge away from a base flange 15F of the assembly 15. Other mechanisms may be used to dispense seeds from the weigh bucket into the housing 12, for example the weigh bucket may be structured to rotate to dump the seeds out of the top or another opening in the weigh bucket. In some cases, the bucket does not incorporate a weight sensor.

Figures 21, 22, 23, 24, 25:
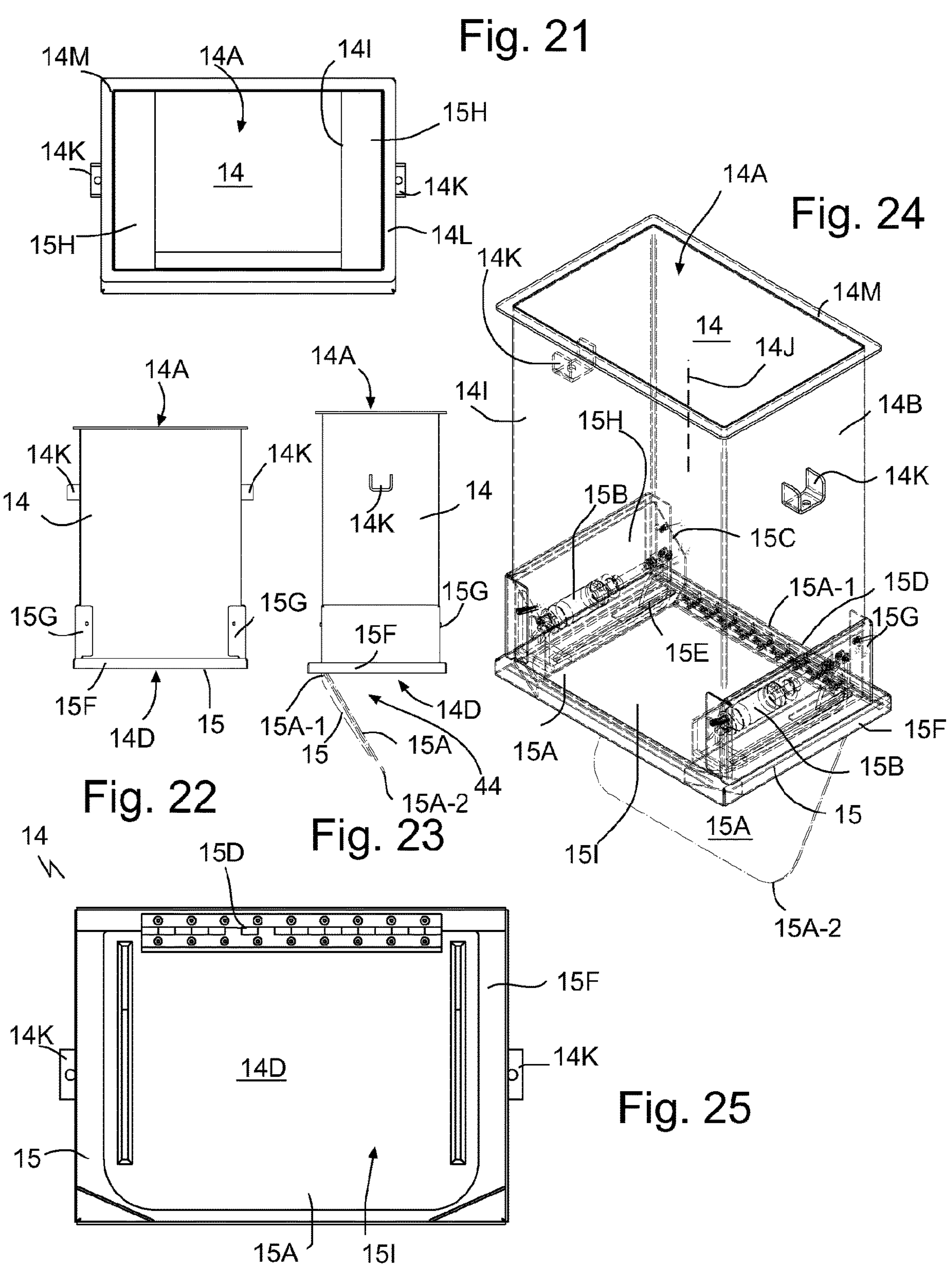
FIG. 21 is a top plan view of a weigh bucket hopper of the seed scale fill system of FIG. 1.
FIG. 22 is a front elevation view of the weigh bucket hopper of FIG. 21.
FIG. 23 is a side elevation view of the weigh bucket hopper of FIG. 21 in an open position.
FIG. 24 is a perspective wireframe view of the weigh bucket hopper of FIG. 21 in an open position.
FIG. 25 is a bottom plan view of the weigh bucket hopper of FIG. 21.

Referring to FIGS. 9 and 21-26, the discharge gate assembly 15 may have suitable parts for operation. In the example shown the assembly 15 is structured to fit over or onto or into the open base end 14D of hopper 14. The assembly 15 may have a peripheral flange 15F, which in the example shown fits over the base end 14D, with side walls 15G that fit part way up the side walls 14B. Referring to FIGS. 24 and 25, base flange 15F defines a discharge opening 15I, over which the gate 15A moves to cover or uncover the opening 15I. Referring to FIGS. 21-26, the gate 15A may form a flap as shown, such as a planar plate that swings. The gate 15A may be pivotally connected at a mounting end 15A-1 to the hopper 14 (assembly 15) via a hinge 15D, the mounting end 15A-1 opposite a discharge or leading end 15A-2. One or both the hopper 14 and assembly 15 may be structured to funnel seeds toward opening 15I, for example assembly 15 may include guide parts such as downwardly sloped ramps 15H to direct seeds into opening 15I.

Referring to FIGS. 21-26, one or more actuators 15B may be connected to open and close the gate 15A. In the example shown the actuators 15B are mounted within respective cavities defined under the ramps 15H. In other cases, actuators 15B are mounted outside the hopper 14, for example to the side walls 14B or underside of hopper 14. Referring to FIG. 26, the actuators 15B may be mounted to interior surfaces of a rear wall 14B-2 opposite a front wall 14B-1. Referring to FIGS. 24-26, the actuators 15B may connect to gate 15A at or near mounting end 15A-1, for example by connecting to respective cam brackets or arms 15E at mounting ends 15A-1. In the example shown the actuators 15B are extended to put the gate 15A in the closed position, and the actuators 15B retract to pull the cam arms 15E and rotate the gate 15A into the open position.

Referring to FIGS. 9 and 21-26, the hopper 14 may be structured to dispense seeds into the housing 12 in a way that minimizes or avoids seed damage. In some cases, it may be advantageous to structure the discharge to increase the chance that discharged seeds land on seeds, rather than on hard surfaces of the housing 12. For example, it is advantageous to have peanuts landing on peanuts. The gate 15A may be structured as a horizontal or laterally oriented door, that swings down slowly or gradually to release seeds so that initial seeds are lowered slowly into the flow of seeds in the housing 12, with the balance of the seeds landing on other seeds that are already revolving. A conventional approach is to dump the seeds quickly and directly straight down or into the center of the machine, although such may increase the change of damages the seeds, as well as other parts of the device 10 such as the rotating disc or other coating dispersion device 20 (shown as a rotor in FIGS. 7-9) or associated components, bearings, or other internal parts. In one case the gate 15A is operated to move less than sixty degrees between open and closed, for example forty-five degrees or less. In some cases, the gate 15A is structured to open to a maximum of sixty degrees off horizontal while dispensing seeds. The gate 15A may be structured to form a chute. The discharge gate 15A may be structured to direct discharged seeds laterally out of the weigh bucket hopper 14 for example laterally and downwardly. The gate 15A may be operated to swing down sufficiently slowly that the entire charge of seeds contained within interior 14I is discharged before reaching the open position. The gate 15A may be positioned to direct the seeds laterally toward the side wall 12B of the housing 12, as during rotation of the mixture in the housing 12 the seeds therein will collect around the side wall 12B thereby increasing the chance of seeds landing on seeds. The discharge gate 15A may form a scoop, for example with side walls (not shown). Referring to FIGS. 1-9 a controller 36 may be connected to operate the gate 15A, for example to initiate gate 15A to discharge at a controlled rate when desired to do so (for example when a full charge is received by hopper 14).

Referring to FIGS. 1-9, 11-20, and 26, a seed scale fill system may be provided, for example incorporating a fill hopper 16. The scale fill system may be provided to fill a weighing or measuring system, such as the weigh bucket hopper 14, although in some cases hopper 16 or a structure made with the same principles and parts may be provided to dispense seeds directly into the housing 12. The fill hopper 16 may have one or more side walls 16B, for example front, rear and lateral walls 16B-1, 16B-2, and 16B-3, respectively. The hopper 16 may define a seed discharge opening 16D, such as an open base end as shown (with the term open base end or open end/open top referring to a structure that defines an opening irrespective of whether a gate is associated with the opening and in a closed or open position). In other cases, the opening may be a lateral opening, such as in a side wall 16B. A suitable gate, such as an articulating gate 17 or gate assembly, may be provided for opening and closing the opening 16D. In use the weigh bucket may be connected to receive seeds from the seed discharge opening. The hopper 16 may have a peripheral flange 16K at its top end 16A. Seeds may travel through hopper 16 along a central axis 16J defined by hopper 16.

Figures 16, 17, 18:
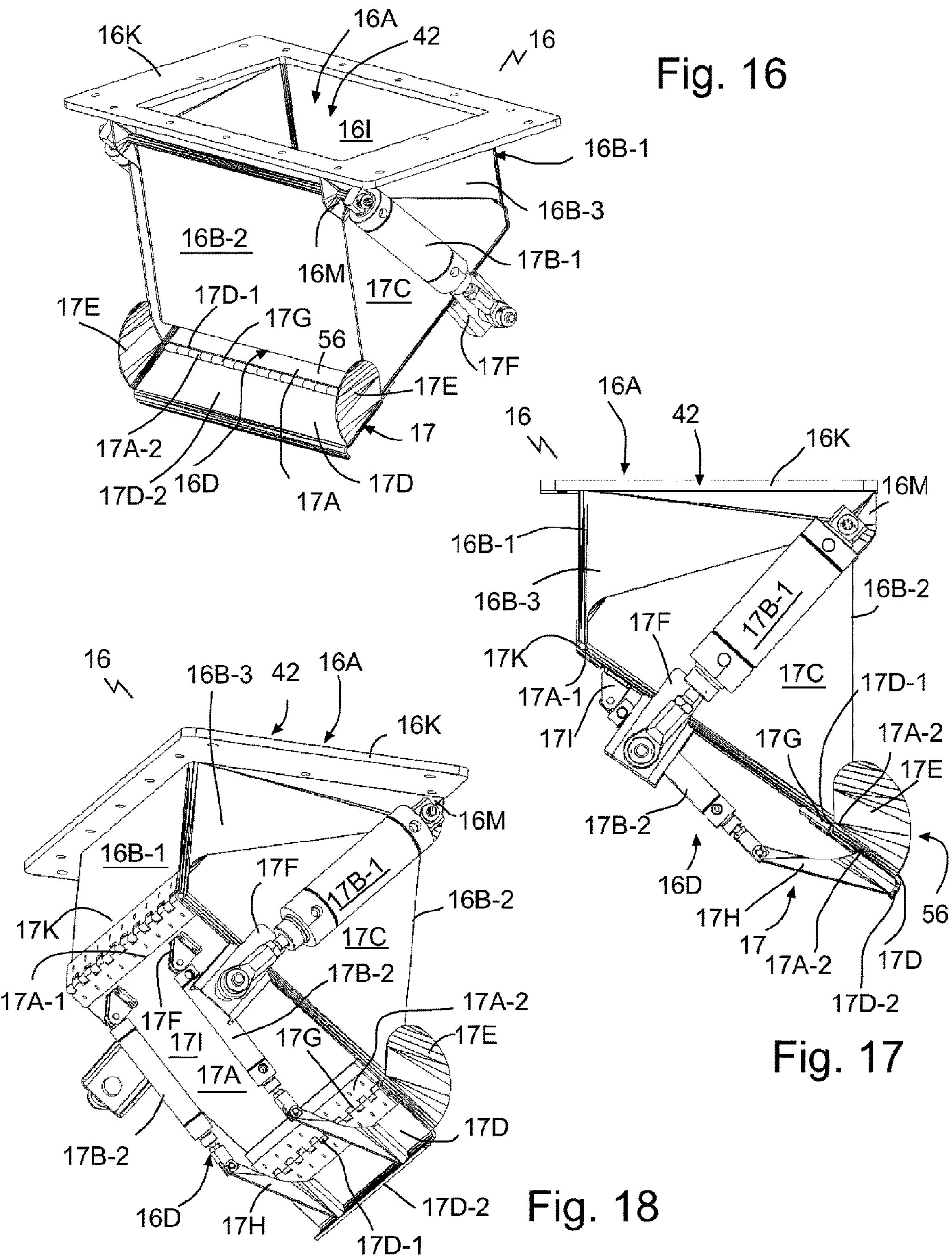
FIG. 16 is a perspective view of the fill hopper of FIG. 11 with the articulating gate in the trickle position.
FIG. 17 is a side elevation view of the fill hopper of FIG. 11 in the trickle position of FIG. 16.
FIG. 18 is a bottom perspective view of the fill hopper of FIG. 11 in the trickle position of FIG. 16.

Referring to FIGS. 14-20, the articulating gate 17 may be structured to move through a range of positions including open, closed, and one or more intermediate, positions to provide different discharge flow rates. The articulating gate 17 may be movable between: a closed position (FIGS. 14-15), an open position (FIGS. 14 and 19-20), and a trickle position (FIGS. 16-18). In use, seeds may be supplied into the fill hopper. The articulating gate 17 may be manipulated into an open position (FIG. 19) to pour the seeds into a weigh bucket. The articulating gate 17 may be manipulated into a trickle position (FIG. 17) to meter seeds into the weigh bucket. The articulating gate 17 may thereafter be closed (FIG. 15) when the weigh bucket is at a predetermined fill level.

Figures 14, 15:
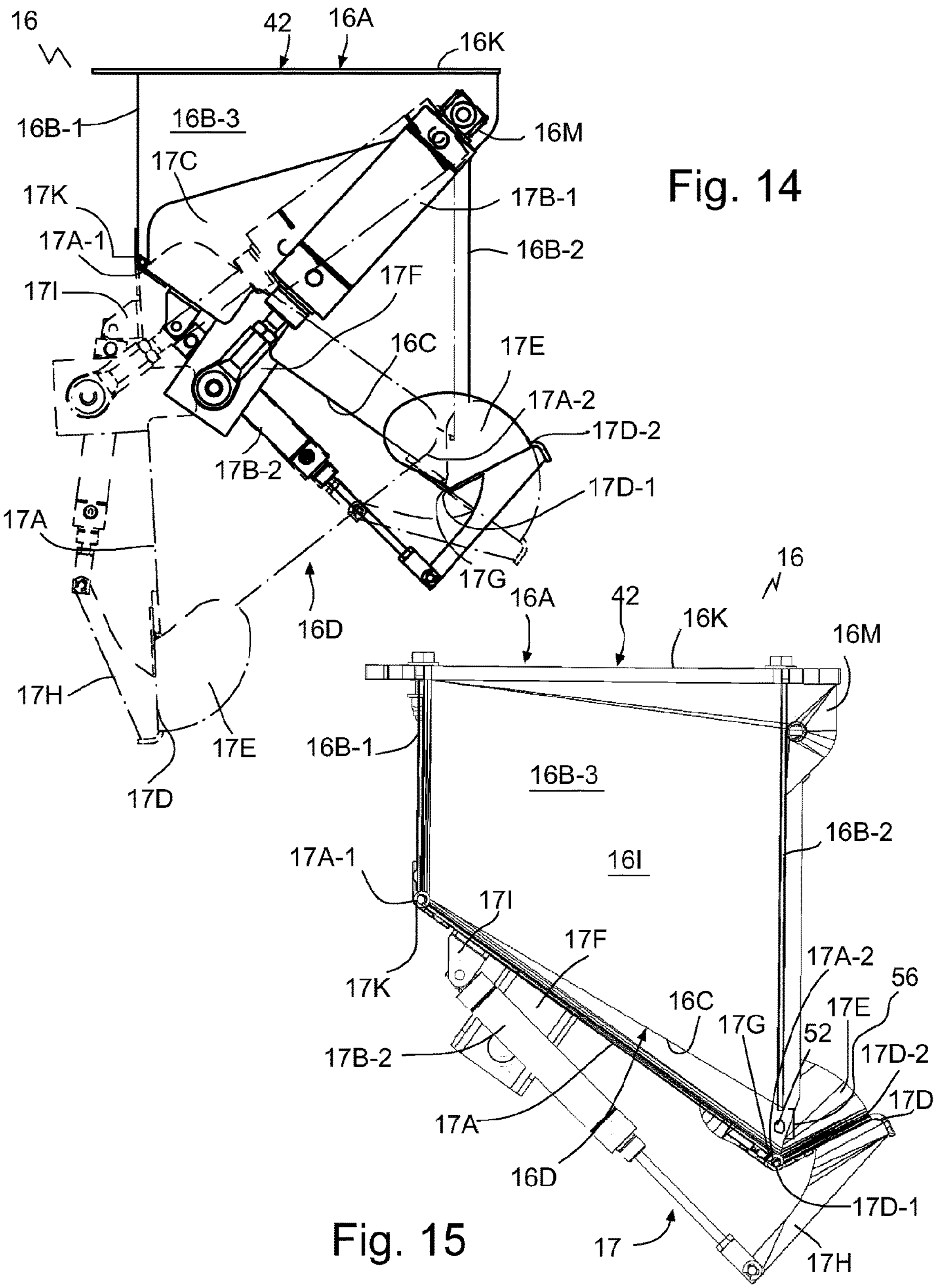
FIG. 14 is a series of superimposed side elevation views of the fill hopper of FIG. 11, with dashed lines indicating an open and closed position for an articulating gate of the fill hopper.
FIG. 15 is a view taken along the 15-15 section lines from FIG. 11, illustrating the fill hopper in a closed position.

Referring to FIG. 15, the gate 17 may be structured to reduce or avoid damaging seeds 52 that are contained within the hopper 16 or being transferred out of the hopper 16. When in the closed position the articulating gate 17 may have sufficient clearance 56 from the fill hopper 16 to avoid pinch points. For example, a clearance 56 may be selected to be greater than an average diameter of seed 52 used in a process, for example equal to or greater (for example 5, 10, 15, or 20% greater or larger) than a maximum diameter of seeds transferred. Despite the clearance, the gate 17 may be structured to close without releasing seeds when in the closed position. For example, as discussed further below, the gate 17 may curl up at its terminal end to prevent seeds that pass through the clearance 56 from being discharged from the hopper 16. Hopper 16 may be used a scale fill mechanism above the drum (housing 12) for measuring a next batch of seeds while a previous batch is mixing in the drum—such an approach is an example of continuous batching. A more conventional approach would be to use a pinch point creating door or claw, which fractures high value seed that becomes inadvertent stuck between the door and hopper. A vibratory feeder may be used to scale fill, although such may not achieve the same capacity as an articulating gate 17 system, which may achieve in a peanut coating application capacities of thirty tonnes per hour or more. The gate 17 shown functions as a scoop door that does not pinch, and whose finger tip/or wrist part allows a trickle speed to slow filling at the end of a measuring stage to permit a weigh scale to catch up and avoid loading errors due to in-flight effects (seeds that are in the air and have not been weighed but have technically been discharged into the hopper 14).

Referring to FIGS. 14-20, the articulating gate 17 may comprise a plurality of flaps pivotally connected together. The articulating gate 17 may comprise a first flap, such as a main door flap 17A pivotally connected to the fill hopper 16. For example, a mounting end 17A-1 of flap 17A may pivotally connect to a side wall 16B-1 or another suitable location on hopper 16. The gate 17 may comprise a second flap 17D pivotally connected to the first flap 17A. For example, a mounting end 17D-1 of flap 17D may pivotally connect to a discharge or flap end 17A-2 of flap 17A or at another suitable location on flap 17A. The ends 17A-2 and 17A-1 may be opposite to one another as shown, so that the flaps curl up and down similar to the movement of joint of a finger. Three, four, or more flaps may be used in the gate 17. The use of plural flaps permits a relatively wider range of intermediate positions between open and closed, which may be leveraged to provide a metering effect on the seeds within the hopper 16 to control flow.

Referring to FIGS. 14-20, the articulating gate 17 may be located at a suitable location on the hopper 14. As above gate 17 may cover a seed discharge opening 14D in an open base end of the hopper 14, for example if the seed discharge opening is defined in a base of the fill hopper 14. The first flap 17A may be connected to swing down and up below the seed discharge opening to converge with and diverge from, respectively, the open base end. The second flap 17D may be connected to swing down and up relative to the first flap. In the example shown each pivotal connection defines a pivot axis, for example plural pivot axes defined by the pivot points provided by hinges 17K and 17G, defined between the first flap and the fill hopper (hinge 17K) and the first flap and the second flap (hinge 17G). The plural pivot axes may be one or both parallel and horizontal, with both cases shown in the Figures. The flaps 17A and 17D are able to fold up and down in an articulating fashion as shown.

Referring to FIGS. 14-20, the gate 17 may be structured to assume a trickle position as desired. Referring to FIG. 17, the first flap 17A may be closed or otherwise in a converged position to permit the trickle position to be configured. Referring to FIGS. 14-20, thus, in one case, the gate 17 may move between an open position is defined when the first flap is open (FIGS. 14 and 19-20), the trickle position when the first flap is closed but the second flap is open (FIGS. 14 and 16-18), and the closed position when the first flap and the second flap are closed (FIGS. 14-15). Referring to FIGS. 14-18, the first flap 17A may be pivotally connected to the first wall 16B-2. When the first flap 17A is in a converged position, the first flap 17A may block the seed discharge opening 16D except for a seed trickle gap (clearance 56 in FIG. 15) defined between the seed discharge opening and the first flap. The seed trickle gap may be defined between the second wall 16B-1 and the discharge or flap end 17D-2. Referring to FIGS. 15-17, as above the gap may be structured to permit lateral movement of the seeds through the seed discharge opening below the second wall when the second flap is open (FIGS. 16-17). Thus, when the gate 17A is converged as shown, and the flap 17D is open, as shown in FIG. 17, trickling (metering) may occur. Trickling may refer to controlled metering. In some cases, in the open position seed flux may be reduced by seventy to ninety percent or more when in the trickle position relative to the open position. In other cases, a trickling position may be assumed when the main flap 17A is not in a completely converged position, for example the flaps 17A and 17D may cooperate to define a trickle position without either or without one of them being in an extreme position in a range of relative pivoting motion.

Referring to FIGS. 14-18, the first flap 17A may be structured to facilitate trickling when converged. As shown the flap 17A may form a seed ramp that is sloped downward toward the flap end 17A-2 of the first flap 17A. Thus, when converged (closed or trickle position), seeds will be drawn by gravity down the ramp toward the gap provided by clearance 56. To facilitate such an effect, base edges 16C of the third and fourth walls 16B-3 may be tapered downward toward the second wall 16B-1.

Referring to FIGS. 14-18, the second flap 17D may cooperate with the seed ramp to close and open the trickle gap. When the first flap 17A is in the converged position, the second flap 17D may be movable between: open (FIGS. 16-18) where the second flap permits the discharge of seeds, and closed (FIGS. 14-15) where the second flap 17D is sloped upward away from the flap end 17A-2 of the first flap 17A to block the discharge of seeds. Such a configuration permits the closing the of the gate 17 without pinching the seeds.

Figures 19, 20:
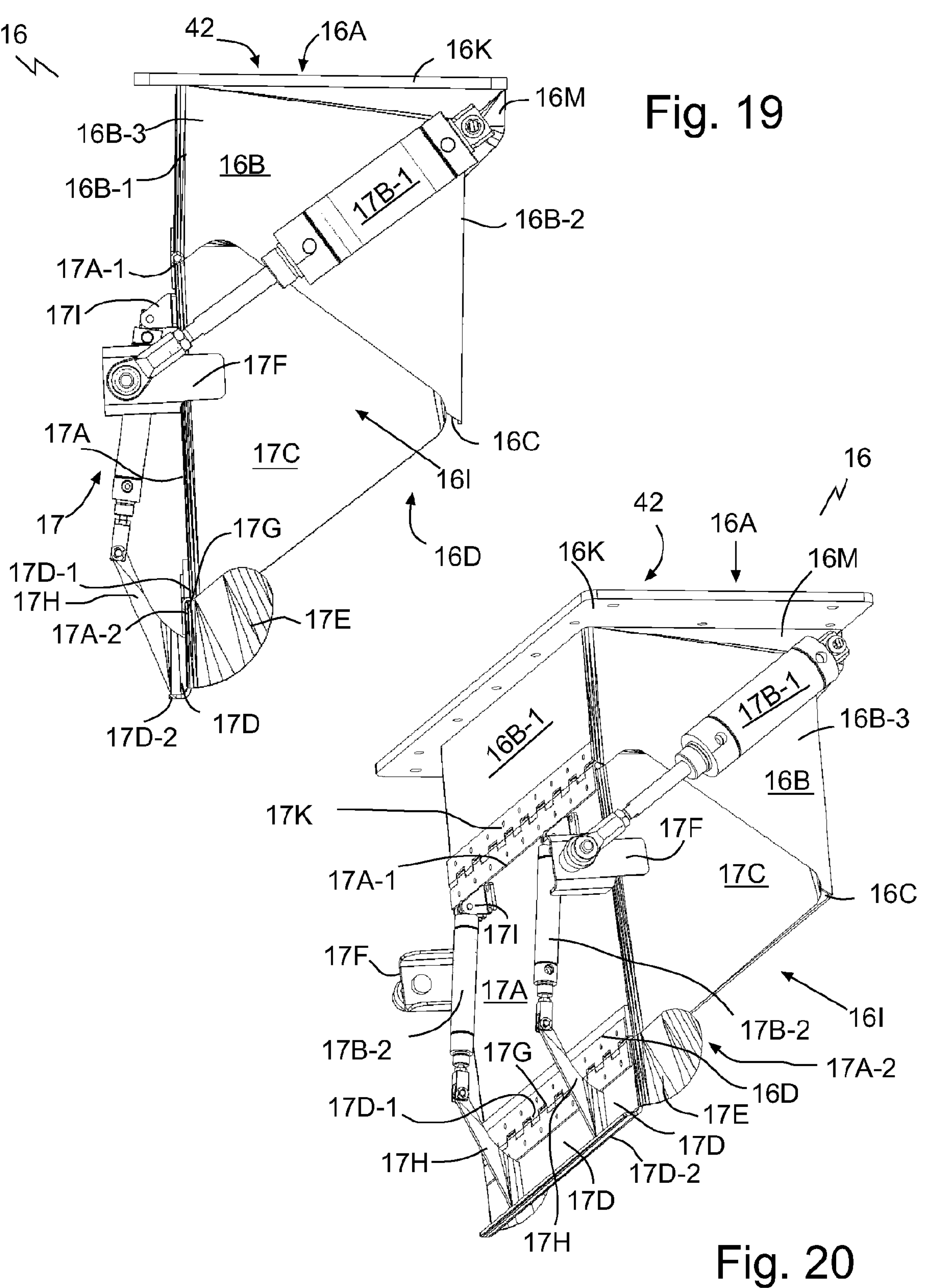
FIG. 19 is a side elevation view of the fill hopper of FIG. 11 in the open position.
FIG. 20 is a bottom perspective view of the fill hopper of FIG. 11 in the open position of FIG. 19.

Referring to FIGS. 14-20, the flaps or one of them may form scoops to control discharge. A scoop may have a base, such as a plate (identified as the parts of the flaps that are identified directly by reference characters 17A or 17D), and upright side walls. The first flap 17A may form a scoop with upright side walls 17C. Walls 17C may have a suitable shape, such as that of a rounded triangle to cooperate with side walls 16B-3 to provide a continuous conduit when in the open position (FIGS. 19-20). Side walls 17C may cover over exterior (shown) or interior surfaces of the hopper 16, although exterior coverage as shown may be less damaging to seeds within the interior 16I of the hopper 16. The second flap 17D may form a scoop with upright side walls 17E. Similar to walls 17C, walls 17E may cover exterior (shown) or interior surfaces of the walls 17C, although exterior coverage as shown may be less damaging to seeds within the chute provided by the seed ramp of gate 17A. Scoop shapes cooperate to direct seeds to exit the gate 17A via a discharge end 17D-2 of the flap 17D, for example to corral the seeds for lateral exit of hopper 16 toward side walls 12B of the housing 12 or to side wall 14B of hopper 14.

Referring to FIGS. 14-20, one or more actuators may be used to operate the flaps. One or more actuators 17B-1 may be connected to pivot the first flap 17A relative to the fill hopper 16. Actuators 17B-1 may be mounted to a suitable location on hopper 16. In the example shown, actuators 17B-1 are mounted to an underside of flange 16K, for example via brackets 16M, although such could be mounted on side walls 16B or to the top or bottom of the hopper 16. Actuators are shown mounted at or near the rear wall 16B-2, which is the same wall where the trickle gap is defined and opposite the wall 16B-1 where the gate 17 is mounted to pivot from. The actuators 17B-1 may connect to gate 17A at a suitable point, such as closer to the mounting end 17A-1 of gate 17A, for example via brackets 17F on side walls 17C or at another suitable location on gate 17A. In the example shown, by extending actuators 17B-1, a torque is induced on flap 17A causing such to pivot downward to diverge from the opening 16D.

Referring to FIGS. 14-20, one or more actuators 17B-2 may be connected to pivot the second flap 17D relative to the first flap 17A. Actuators 17B-2 may be mounted to a suitable location on hopper 16 or flap 17A. In the example shown, actuators 17B-2 are mounted to an underside of gate 17A, for example via brackets 17I, although such could be mounted on side walls 16B or to the top or bottom of the hopper 16. Actuators are shown mounted near the front wall 16B-1, which is the same wall where the gate 17 is mounted to pivot from. The actuators 17B-2 may connect to gate 17A at a suitable point, such as closer to the mounting end 17A-1 of gate 17A, for example via brackets 17I op on side walls 17C or at another suitable location on gate 17A. Actuators 17B-2 may mount to an underside of flap 17D for example via brackets 17H, which are extended lever arms. In the example shown, by extending actuators 17B-2, a torque is induced on flap 17D causing such to pivot upward about flap end 17A-2 of gate 17A to close. By contrast, a retraction of actuators 17B-2 will cause flap 17D to rotate downward to diverge and open. By mounting the actuators 17B-2 on flap 17A the operation of the flap 17D may be made independent of the operation of flap 17A.

Other systems may be used to provide seeds in a controlled fashion into the weigh bucket or housing 12. Seeds may be deposited through a seed inlet, such as a hopper, into a metering portion that may be configured as a seed wheel. A seed metering wheel may include a rotating wheel and pockets of identical depth that are designed to be filled with a precise and identical amount of seeds in each pocket. Another variation of a scale filling system includes a continuous scale system for larger scale operations, and batch weighing hoppers for smaller scale operations.

Referring to FIGS. 1-9, a controller 36 may be used to operate the gate 17A. For example, controller 36 may be connected to operate the articulating gate 17A and receive signals from the weight sensor (not shown). The controller 36 may be programmed to implement a discharge pattern of various positions for gate 17A. For example, the controller 36 may be configured to operate the articulated gate 17A to fill the weigh bucket to a predetermined seed fill level by carrying out various steps. Referring to FIGS. 19-20, the articulated gate 17A may be diverged, for example manipulated into an open position to fill the weigh bucket with seeds from the fill hopper 16. Referring to FIGS. 16-18, when the weigh bucket is between an intermediate seed fill level and the predetermined seed fill level, the articulated gate 17A may be manipulated into a trickle position shown. Referring to FIG. 15, the controller 36 may be configured to operate the articulated gate 17A by, when the weigh bucket is at or near the predetermined seed fill level, moving the articulated gate 17A into the closed position. The fill level in the weigh bucket may be determined by suitable methods, such as by measuring weight in the bucket during filling, or by measuring volume or by measuring time assuming a particular flow rate, or using other sensor data such as that from a proximity sensor (not shown). By slowing to a trickle between an intermediate fill level (for example ninety percent full or more) and a full fill level, errors in filling from the time lag caused by sensor lag and drift from moving seeds is eliminated, leaving more accurate measurements to be made possible. In some cases, the controller 36 operates the gate 17A to hold in the trickle position during filling, for example near the beginning or end of a fill cycle.

Referring to FIGS. 1-9 and 26, the hoppers 14 and/or 16 may be supported in a suitable fashion. In the example shown, an upright structural frame or support stand 32 may be provided. The stand 32 may have ground engaging base members such as base beams 32D. Beams 32D may be hollow to define tine passages 32G with suitable dimensions to receive fork tines 34B of a pallet jack 34 or other machine structured to transport the stand 32 to a suitable location. Base beams 32D may be structured to fit underneath the housing 12 to permit the stand 32 to be brought into close proximity with housing 12 for operations. An upright frame such as made with vertical columns 32B may extend to a top end 32A of the stand 32. The stand 32 may support the hoppers by a suitable fashion, such as with lateral support aims 32E and 32F or one or both of them. Lateral support arms 32E may be provided to support the scale fill hopper 16, for example to fit under flange 16K so that hopper 16 may rest upon the arms 32E. In some cases, the hopper 16 may secure to (for example with fasteners or welding or other connection methods) the aims 32E. Lateral support arms 32F may be provided to support the scale hopper 14. For example, the arms 32F may mate with brackets 14K on the exterior surfaces of side walls 14B of hopper 14, for example securing by a suitable method such as with fasteners as shown.

Referring to FIGS. 1-9 and 34-42, a suitable coated seed discharge system may be used to discharge and collect coated seeds from housing 12. In the example shown, a discharge chute 30 may be present over a discharge port 12G in side wall 12B of housing 12. A gate 31 may be provided over the port 12G to open and close the port 12G as desired. Referring to FIGS. 7, 28, and 34, during use a mixture of seeds and seed coating may be stirred within an interior 12I of a seed mixing bowl in a direction 18K of stirring rotation around an axis 12J of the seed mixing bowl. When mixing is completed to a sufficient degree, or when it is otherwise desired, coated seeds may be discharged from the seed mixing bowl or mixer (housing 12). In such a case, the discharge gate 31, if present, may be opened to permit seeds to exit the housing 12 through port 12G. The mixture may continue to rotate or be stirred during discharge, for example to improve discharge by leveraging the circumferential force imparted upon the mixture via the stirring action. Coated seeds may be discharged using such rotational energy through discharge port 12G in the cylindrical side wall 12B into the discharge chute 30. Coated seeds that enter the chute 30 may be collected or transferred to a further container such as a bucket (not shown) or ducting (not shown) in communication with the chute 30.

Referring to FIG. 34, the discharge chute 30 may be structured to slow down and collect, by dissipating kinetic energy from, the moving seeds with minimal or no seed damage. Referring to FIGS. 34-42, in the example shown the chute 30 may have a side wall 30B that is shaped, for example continuously around a seed chute pathway, to channel and slow-moving seeds.

Referring to FIG. 34, the side wall 30B may include an arcuate leading interior wall 30B-1 shaped to direct coated seeds to move radially outward in a chute rotational direction 30K that is opposite to the direction 18K of stirring rotation. Thus, the leading wall 30B-1, when viewed axially, for example from above or below the device 10 or along either axis 12J or 30J, has an arcuate shape, such as a circular shape that guides seeds around wall 30B. The direction of rotation 30K within the chute 30 may be defined about an axis 30J, and the wall 30B-1 may follow a part of a circumference defined around that axis 30J.

Referring to FIGS. 34-42, the chute 30 may have other suitable features or shapes. The wall 30B-1 may connect or level off into a planar side wall 30B-2. Wall 30B-2 may extend to a rear wall 30B-3. Walls 30B-1 to 30B-3 may be structured and dimensioned to avoid or minimize any seeds from contacting wall 30B-3, so that by the time the seeds travel into chute 30 and run out of kinetic energy, falling to a base 30D of the chute 30, such seeds do not reach the rear wall 30B-3. The rear wall 30B-3 may be opposite the arcuate leading interior wall 30B-1.

Referring to FIGS. 34-42, the base 30D of the chute 30 may be suitably structured to collect and direct coated seeds. Base 30D of the discharge chute 30 may be sloped downward moving radially outward from the cylindrical side wall 12B of housing 12, thus directing collected seeds by gravity along the base 30D. A portion 30D-2 of the base 30D of the discharge chute 30 may be sloped downward moving toward the arcuate leading interior wall 30B-1, such that any coated seeds that make it near the rear wall 30B-3 may be guided downward away from the wall 30B-3.

Referring to FIGS. 34-42, the discharge chute 30 may have a suitable seed exit opening. For example, the discharge chute 30 may define a seed exit opening 30B in a base 30D of the discharge chute 30. The opening 30B may have a suitable shape, such as an arcuate (FIG. 34) or rectangular (FIG. 40) shape, or another shape. In the example shown the opening 30B is located at the lowest point in the base 30D, with the adjacent base portions shaped to funnel incoming coated seeds toward the opening 30B. The opening 30B may be covered by a gate (not shown) that can be opened or closed to collect and dispense coated seeds. In some cases, the opening 30B is always open, and a container or conveyor (not shown) is located in use below the opening 30B to collect coated seeds.

Figures 37, 38, 39, 40, 41, 42:
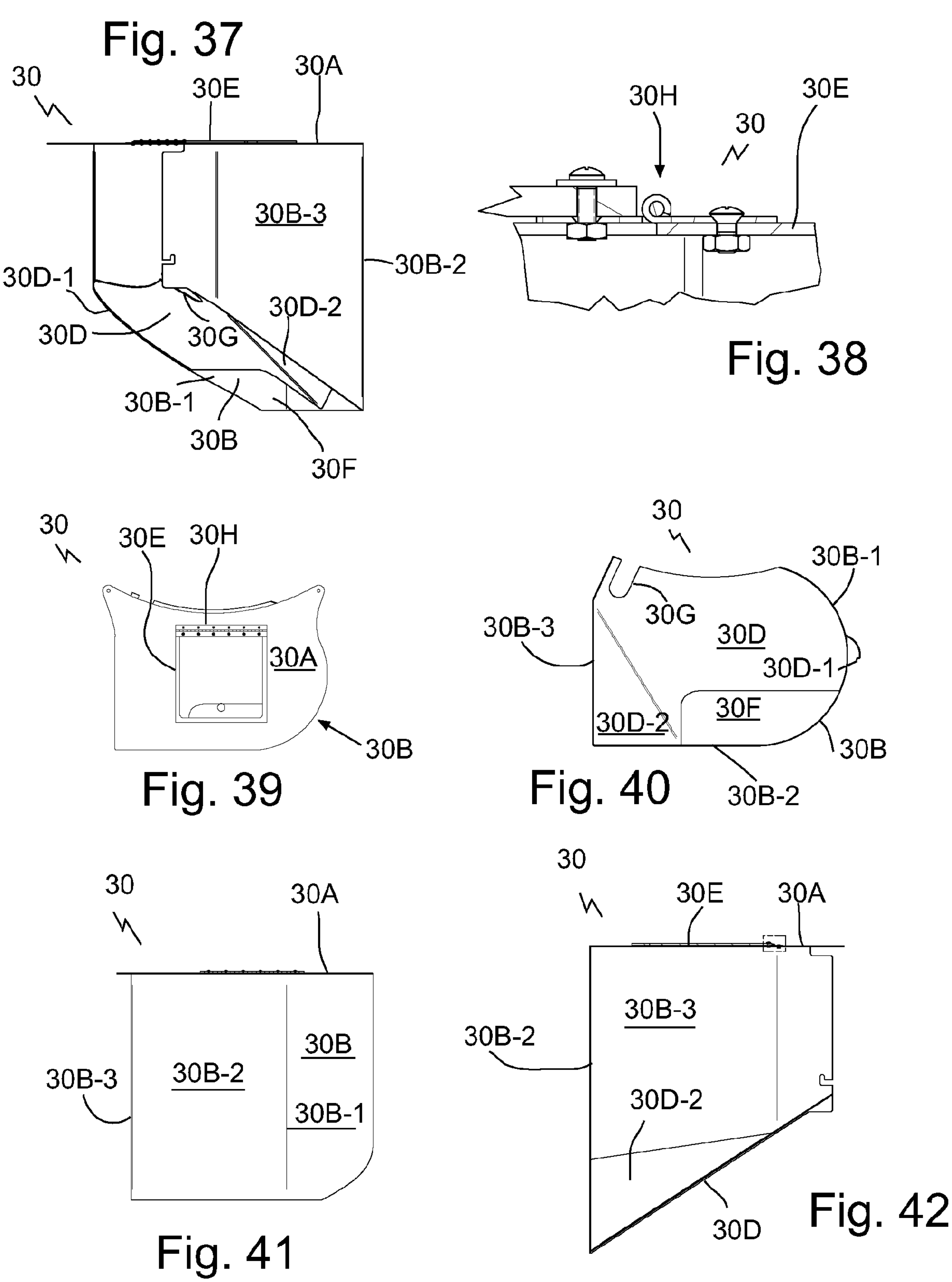
FIG. 37 is a rear elevation view of the discharge chute of the batch seed coating device of FIG. 1.
FIG. 38 is a section view close up of the hinge of the top hatch gate of the discharge chute of the batch seed coating device of FIG. 1.
FIG. 39 is a top plan view of the discharge chute of the batch seed coating device of FIG. 1, with the top gate hatch removed.
FIG. 40 is a bottom plan view of the discharge chute of the batch seed coating device of FIG. 1.
FIG. 41 is a side elevation view of the discharge chute of the batch seed coating device of FIG. 1.
FIG. 42 is a front elevation view of the discharge chute of the batch seed coating device of FIG. 1, with the side wall removed to illustrate the interior.

Referring to FIGS. 35-42, the chute 30 may have other suitable features. The chute 30 may have a roof 30A, which may contain a top hatch or gate 30E. The gate 30E may be pivotally connected by a hinge 30H. Referring to FIG. 38, the gate 30E may be spring loaded into a closed position, with hinge 30H shown in cross section. The chute 30 may be secured, for example by fasteners or welding or other connection mechanisms, to the housing 12.

Referring to FIGS. 1-2, 6-7, 34, and 40, a gate 31 may be provided over port 12G in side wall 12B of the housing 12. Referring to FIG. 34, the gate 31 may be shaped to follow the shape of the side wall 12B, for example the gate 31 may have an inner concave (cylindrical in the example shown) wall 31A that is flush with and continuous with inner surfaces of side wall 12B of housing 12 to avoid interfering with the stirring operation of the contents of the housing 12 during seed coating. The gate 31 may have an outer convex side wall 31B. A hinge 31C may be provided, and for example may define an axis that is parallel with axis 12J. Referring to FIGS. 1-2, 6-7, 34, and 40, the device and chute 30 may be structured to facilitate automatic or actuated operation of the gate 31. An actuator 48E may be provided, for example mounted to a structural frame 40 of the device 10, and connected to move the discharge gate 31 between an open and closed position (an example of the open position is only shown in FIG. 34). The actuator 48E may have a suitable drive connection to an axle 48A that is mounted to rotate the gate 31 open and closed, for example via a servo lever arm 48C or arms. The axle 48A may be secured to the device 10 by a mounting guide 48D (for example that may have one or more bearings) on the housing 12. The gate 31 may be operated by the controller 36 to automate production, as may the stirring and injection of components.

Figures 43, 44, 45, 46, 47:
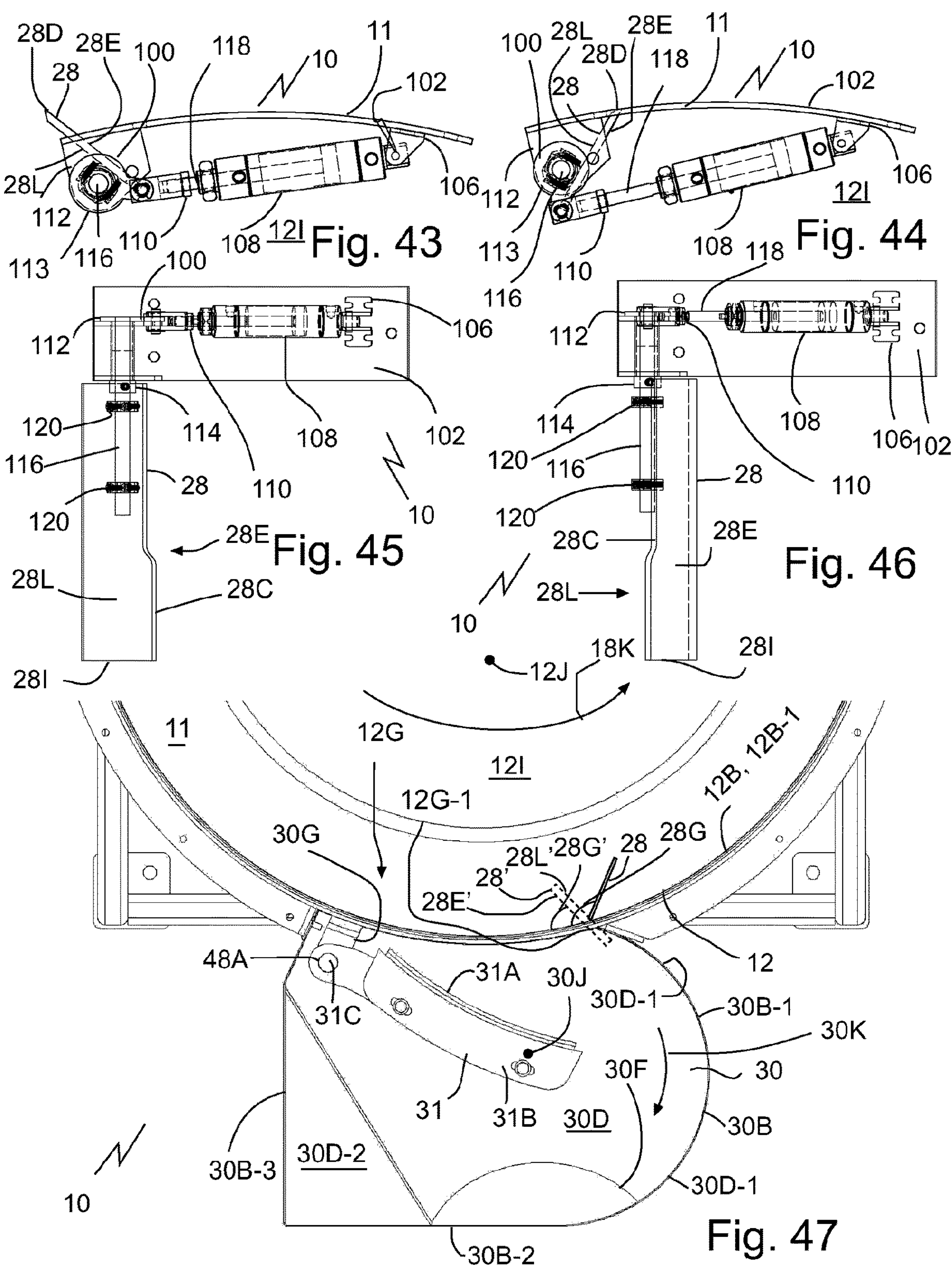
FIG. 43 is a top plan view, partially in section, of a moveable blade for the batch seed coating device of FIG. 1, with the blade in a discharge position.
FIG. 44 is a top plan view, partially in section, of the moveable blade of FIG. 43 with the blade in a recirculating position.
FIG. 45 is a side elevation view, partially in section, of the moveable blade of FIG. 43 with the blade in the discharge position.
FIG. 46 is a side elevation view, partially in section, of the moveable blade of FIG. 43 with the blade in the recirculating position.
FIG. 47 is a view taken along the 47-47 section lines of FIG. 6, illustrating the discharge gate, discharge chute, and the moveable blade of FIG. 43 in both the discharge (dashed lines) and recirculating positions (solid lines).
Figure 48:
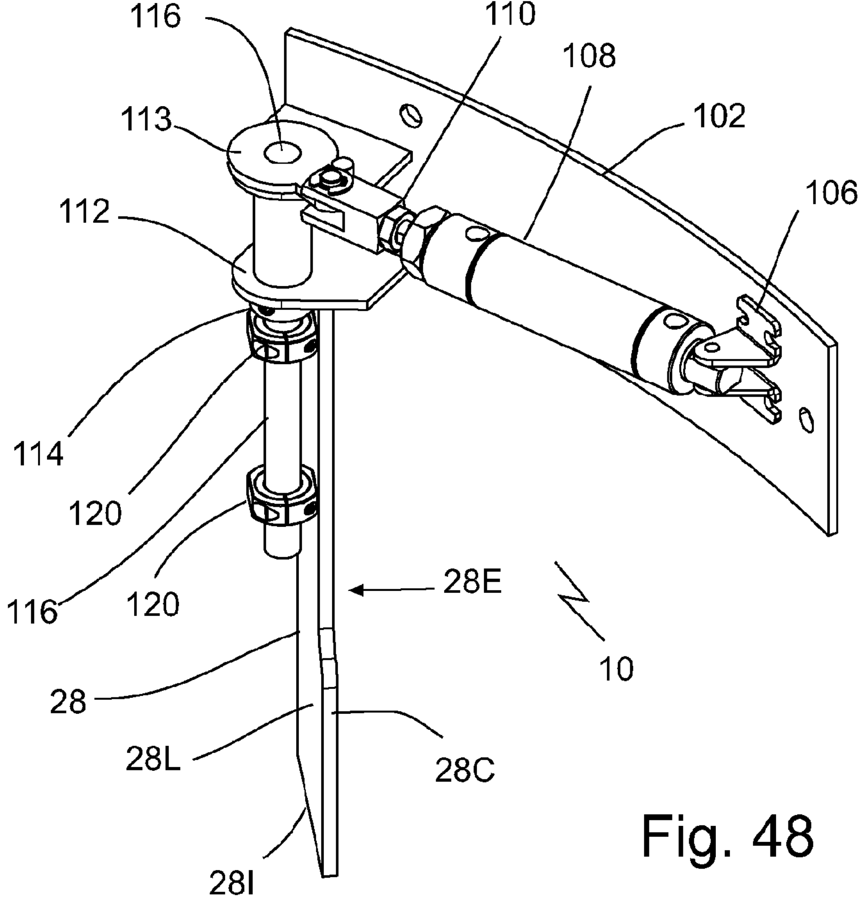
FIG. 48 is a perspective view of the moveable blade of FIG. 43 with the blade in the discharge position.

Referring to FIGS. 43-48 a batch seed coating device 10 may have a moveable mixing blade 28. Referring to FIGS. 43-47, the mixing blade 28 may be mounted, for example to the cylindrical side wall 12B of the housing 12, to move within the interior 12I of the seed mixing bowl 11 between a recirculating position (FIG. 44, and solid lines in FIG. 47), and a discharge position (FIG. 43, and dashed lines in FIG. 47). Referring to FIGS. 44, 46, and 47, when in the recirculating position, the leading face 28E of the mixing blade 28 may be angled to in use direct the mixture radially inward. While the blade 28 is in the recirculating position, the mixture of seeds and seed coating may be stirred in the bowl, with the leading face 28E of the mixing blade 28 directing the mixture radially inward. Referring to FIGS. 43, 45, and 47, when in the discharge position, the leading face 28E may be angled to direct the mixture radially outward into the discharge port 12G. The coated seeds may be discharged from the seed mixing bowl through the discharge port 12G while the leading face 28E is angled to direct the mixture radially outward into the discharge port 12G.

Referring to FIGS. 43-47, the moveable mixing blade 28 may be re-positioned in use between the recirculating and discharge positions. At a suitable time, such as before, after, or during the initiation of the discharging stage, the mixing blade 28 may be repositioned from the recirculating position to the discharge position. The discharging stage may be initiated by a suitable event, such as the opening of a discharge gate 31 at a suitable point in a seed coating process. In some cases, the mixing blade 28 is mounted to or mounted to move with the discharge gate 31, and in other cases is an independent assembly, which may or may not function in tandem with the assembly 15. At a suitable time, such as before, after, or during the completion of the discharging stage, the mixing blade 28 may be re-positioned from the discharge position into the recirculating position. The embodiment illustrated may accelerate discharge, for example by speeding up the discharge and also improving the quality of mixing. The placement of the rotating mixing paddle may be in the door opening, for example the moveable mixing blade 28 may be mounted at or near a downstream end 12G-1 of the discharge port 12G (FIG. 47). While the treatment is being applied the seed may be folded towards the center by moveable blade 28, providing rapid blending of seed in applications either dry or wet, and sweeping seed across the bottom of the rotor pan thereby scrubbing treatment overspray off of the rotor. When treating seed, the drum discharge door may be open, with the rotating mixing bar or blade 28 rotating a suitable amount such as 90° counterclockwise, assisting the seed to discharge much more rapidly, yet more gently then having the seed spin around for a longer period of time (as would be the case without blade 28) causing potential damage to the seed. By accelerating the discharge speed there may be an increase in the efficiency of the treater/coater device 10.

Referring to FIGS. 43-48 the moveable mixing blade 28 may be distinct from other mixing blades 28, which may be fixed or moveable themselves. In other cases, the moveable mixing blade 28 may operate and/or be structured the same as the other blades 28, for example if all blades 28 are moveable. In some cases, only one moveable mixing blade 28 is provided. In some cases, all blades 28 are fixed.

Referring to FIG. 47, the leading face 28E may assume a suitable angle depending on position. As shown in solid lines, when in the recirculating position, the leading face 28 may be angled radially inward along a direction of rotation 18K about the rotational axis 12J. When in the recirculating position, the leading face 28E of the mixing blade 28 may be oriented to form a suitable angle, such as an obtuse angle 28G with a circumference of rotation defined about the rotational axis (for example shown by the interior surfaces of the side wall 12B). An obtuse angle may be less damaging to rotating seeds than would be a perpendicularly angled blade. As shown in dashed lines, when in the discharge position, the leading face 28E of the mixing blade 28 may be angled radially outward along the direction of rotation 18K about the rotational axis. When in the discharge position, the leading face 28E of the mixing blade 28 may be oriented to form a suitable angle, such as an acute angle 28G' with a circumference of rotation defined about the rotational axis (for example shown by the interior surfaces of the side wall 12B).

Referring to FIGS. 43-48, the flap or moveable blade 28 may move via a suitable path or pattern. In the example shown, the blade 28 is mounted to rotate, for example about a blade axis (defined coaxial with rotating shaft 116) that is perpendicular to the rotational axis 12J and defined within the interior 12I. In such a case, re-positioning comprises rotating the mixing blade 28 about the blade axis. In the example shown, a mount such as a bracket 100 may be secured to side wall 12B, for example via a mount weldment or plate 102. The bracket 100 shown comprises upper and lower plates perpendicularly mounted to plate 102. The bracket 100 may provide a frame 112 such as a shaft weldment to support and align the shaft 116. The shaft 116 may secure via brackets 120 to the blade 28, such as to a rear face 28L of blade 28 so as not to interfere with the flow of the mixture in the interior. A shaft collar 114 may support and align the shaft 116. The blade 28 shown is structured to rotate about the shaft 116, however in other embodiments the blade 28 may move by a suitable path between positions, such as by one or more of translating, sliding, swinging, or by other complex movements such as rotating and sliding simultaneously or in stepwise fashion.

Referring to FIGS. 43-48, the moveable blade 28 may move by a suitable mechanism. A blade actuator, such as a hydraulic cylinder 108, may be mounted to move the mixing blade 28 between the discharge position and the recirculating position. The blade actuator 28 may comprise a linear actuator such as hydraulic cylinder 108. A crank arm such as arm 113 may be acted upon by a clevis 110 or other lever manipulated by the actuator (such as driven by piston 118) to rotate the mixing blade 28 about shaft 116. The actuator may mount to the device 10 by a suitable fashion, such as by a mount 106 secured to the plate 102. Although shown as operating independently with the discharge gate 31, in some cases the blade 28 and gate 31 may be connected to move together or in tandem.

Referring to FIGS. 1-9 the device 10 may have other suitable features. The device 10 may be mounted on a structural frame 40, which may include one or more of columns 40A, beams 40B, and ground engaging members 40C (in some cases pads, in some cases wheels or other members). Stirring motor 24 may be mounted to frame 40.

Referring to FIGS. 1-10 the device 10 may incorporate a suitable method of supplying seed coating, such as via a seed coating injector 38. The seed coating injector 38 may be configured to disperse seed coating onto seeds 52. Seed coating may be mixed with seeds prior to or within housing 12, although mixing within is shown in the figures. Referring to FIGS. 7-10, the injector 38 may comprise one or more such as a plurality of nozzles 38A connected to a seed coating supply source, such as a tank, manifold, mixing station (for mixing plural components of seed coating), hopper, or other supply source. In the example shown the injector 38 is set up for injection of a liquid seed coating. An injection housing 38B may extend into interior 12I of housing 12, for example through an injection port 12E for example in roof 12A. One or more fluid conduits 38C may extend from one or more injection ports 38E, which may be bussed within a manifold 38D or kept separate if post injection mixing of plural coating components is used. In the example shown the nozzles 38A are configured to inject seed coating into the seed mixing bowl.

Referring to FIGS. 1-10 the device 10 may incorporate a suitable mechanism for dispersing seed coating within the interior 12I of housing 12. A coating dispersion device 20 may be used, for example incorporating a rotary disc 20A mounted for rotation to housing 12. In the example shown, the disc 20A is driven through a drive shaft 20B supported by one or more bearings 20C and connected to a motor 22. The operation of the motor 22 (and any accompanying power transfer such as via a gearbox or transmission) rotates the disc 20A about an axis 20J, which in the example is coaxial axes 20J and 18J. The disc 20A may be oriented to receive and redirect spray from nozzles 38A, for example to disperse sprayed seed coating about the housing 12, or in the example shown in a fountain-like fashion where the coating sprays outward in a three hundred and sixty degree circumferential spray toward wall 12B to contact seeds that are being stirred about such walls.

Referring to FIGS. 1-9, the housing 12 may incorporate various other mechanisms for mixing seed coating components with seeds within housing 12. One or more ports 12K may be located in the roof 12A, for example for permitting visual inspection of the contents of the interior 12I or for permitting addition of various components such as binders, fillers, seeds, or active ingredients. In some cases, liquid adhesive may be supplied via injector 38, while one or more of solid or powdered fillers or active ingredients are supplied via ports 12K. Any such additives may be measured prior to being poured or injected through ports 12K, which may be in side wall 12B in some cases.

Suitable adhesives may be used in the seed coating applied to the seeds. An adhesive polymer may be used, such as copolymers of vinyl pyrrolidone and vinyl acetate, poly (methyl vinyl ether) maleic anhydride copolymers, free acids of the copolymer of methyl vinyl ether and maleic anhydride, vinylpyrroldone/styrene copolymers, partially hydrolyzed polyvinyl alcohols, vinyl acetate/butyl acrylate copolymers, vinyl acetate homopolymers, terpolymers, acrylic copolymers, styrene/acrylic estercopolymers, vinyl acetate/ethylene copolymers and polyvinyl acetate. Caseinate salts such as the sodium salt may be used.

Suitable fillers may be used in the seed coating applied to the seeds. The filler/carrier may comprise peat. Alternatively, vermiculite, clay, silt, graphite, talc, filter mud, coir dust, bagasse, composted corn cobs or coal dust may be used. The intermediate or carrier may be relatively finely divided, for example in powder form. Powdered particles capable of passing a screen of 200 mesh may be used, although particles smaller than 75 microns may be used, as may other sizes larger or smaller. These finely-divided powders may be effective, especially in the case of intermediates or carriers such as clays (particularly kaolin), graphite, or charcoal (particularly activated charcoal). Some mechanical interlocking between powdered bacteria and the powdery intermediate may occur, and the irregular jagged edges of the discrete powdery particles of the carrier or intermediate may contribute to a mechanical interlocking with the outer surface of legume seeds, particularly on microscopically irregular surface areas thereof, or such irregular surface areas thereof as, for example, the hilum area (although the entire surface of seeds is covered with a clinging dust coating of inoculant).

Suitable active ingredients may be used in the seed coating applied to the seeds. An inoculant may include soil or plant inoculants shall include any carrier or culture of a specific micro-organism or mixture of micro-organisms represented to improve the soil or the growth, quality, or yield of plants, and also any seed or fertilizer represented to be inoculated with such a culture. Inoculants may include substances manufactured, sold or represented for use in the improvement of the physical condition of the soil or to aid plant growth or crop yields. Inoculants may include a formulation containing pure or predetermined mixtures of living bacteria, fungi or virus particles for the treatment of seed, seedlings or other plant propagation material for the purpose of enhancing the growth capabilities or disease resistance or otherwise altering the properties of the eventual plants or crop. Inoculants may include any chemical or biological substance of mixture of substances or device distributed in this state to be applied to soil, plants or seeds for soil corrective purposes; or which is intended to improve germination, growth, quality, yield, product quality, reproduction, flavor, or other desirable characteristics of plants or which is intended to produce any chemical, biochemical, biological or physical change in soil.

Various microorganisms may be used as active ingredients. In some cases, *Rhizobium* (including *Bradyrhizobium*), *Pseudomonas, Serratia, Bacillus, Pasteuria, Azotobacter, Enterobacter, Azospirillum, Cyanobacteria, Gliocladium, Trichoderma, Coniotherium, Verticillium, Paecilomyces, Metarhizium*, mycorrhizal fungi and entomophilic nematodes may be used. Many microorganisms are known to exert beneficial effects on plant growth. Among these are the nitrogen-fixing *Rhizobium* species, which are symbionts of leguminous species. Azospirillum species, which are free-living nitrogen-fixing bacteria associated with the roots of grasses, are also now recognized for their plant growth-promoting qualities. Certain microorganisms may function in a number of ways to improve growth of the plants, to improve N and P status of plants or to control certain pests and diseases which affect plants. These organisms include bacteria of the genera *Rhizobium* (including *Bradyrhizobium*), *Pseudomonas, Serratia, Bacillus, Pasteuria, Azobacter, Enterobacter, Azospirillum*, and *Cyanobacteria*, (blue-green algae), fungi of the genera *Gliocladium, Trichoderma, Coniotherium, Verticillium, Paecilomyces, Metarhizium*, and mycorrhizal fungi, and entomophilic nematodes when present in the soil in the vicinity of the roots of particular plants. Certain thiazolylisoxazolines may be used as fungicides. After bacteria has been added, a small quantity of nutrient material (e.g., monoor di-saccharides such as sucrose, glucose, etc.) may be added to the active bacteria at this stage. Quantities of nutrient material sufficient to approximately equal the weight of the bacteria in the dormant state, or even larger quantities, may be used.

Various suitable seed coating machines and methods may be used. In some cases, a coating fluid may be applied whereby seeds are dispersed with a seed dispersing member. In some cases, a process may be used for dressing seed in which seed is guided over a dispensing cone through a jet of dressing and onto a rotary table. In some cases, a mixing bowl may be connected to a high speed, multi-turn actuator and a mechanism to feed seed into the mixing bowl. The bowl rotates to rotate seed being treated therein. The seed treating formulation is sprayed in the bowl while the seed is being rotated to uniformly coat the seed with the formulation. In some cases, a rotating brush may be used for dispensing the fluid. The brush may receive fluid that is hurled outwardly from the brush fibers by the centrifugal force provided by the rotation. In some cases, a rotating plate may be used for dispensing the fluid. The fluid may be poured on the plate and hurled outwardly by centrifugal force. Flutes may be included in the plate to increase the vertical distance in which droplets are hurled outwardly. In some cases, a drying mechanism may be used with a hot air feed that can reduce drying time as compared to a coating device without a hot air feed. In some cases, a mixer may include an open bottom for dispersing seed. In some cases, knives, scrapers or buffers of various shapes may be inserted in a mixing vessel in order to prevent the products to be coated from turning with the vessel. A suitable coating vessel may be of various shapes. Vessels of a spherical, cylindrical, ellipsoidal, flattened spherical, rectangular, polygonal or other shapes may be employed. The coating vessel may have a flat bottom and a side wall that are joined to each other by a fillet radius in order to make it easier to set the products to be coated in rotation.

The nature of the materials used to construct the coating vessels may depend on their use. Thus, coating vessels may be made of a metal such as stainless steel, of plastic or any other suitable material. In addition, the inner wall of the vessel may have been subjected to various treatments such as, in particular, a nonstick treatment such as, for example, a coating with polymers such as polyvinylidene fluoride. Preferably the interior of the vessel should have only rounded corners.

Coating substances may be used that are in the form of powders, uniformly sprayed into the coating vessel during its rotation and to spray, using a gun, a binder or an adhesive which bonds the powder(s) to the products to be coated. Several growth-promoting mechanisms are known, which may influence the plant in a direct or indirect manner.

Figure 3:
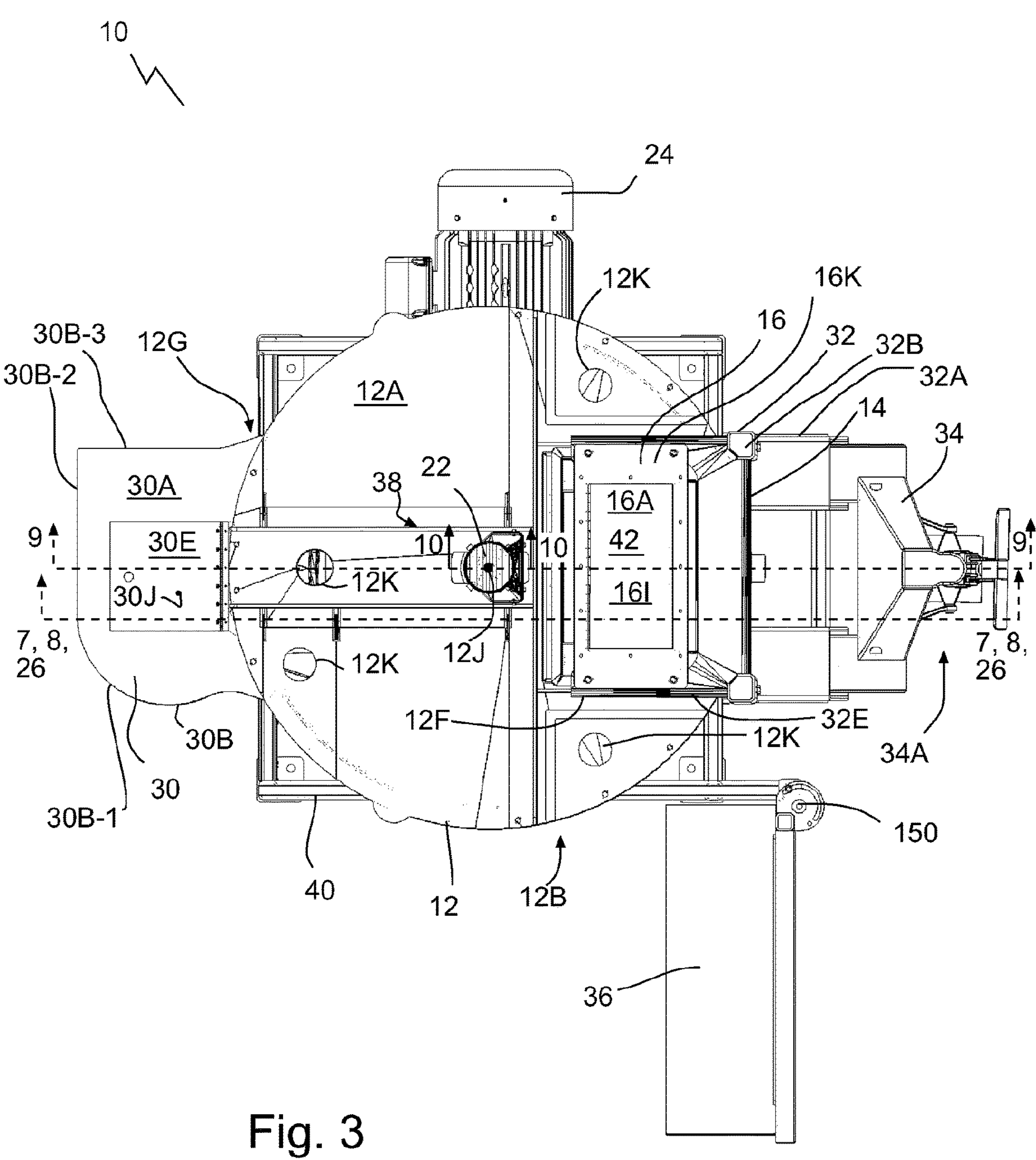
FIG. 3 is a top plan view of the batch seed coating device of FIG. 1.
Figure 4:
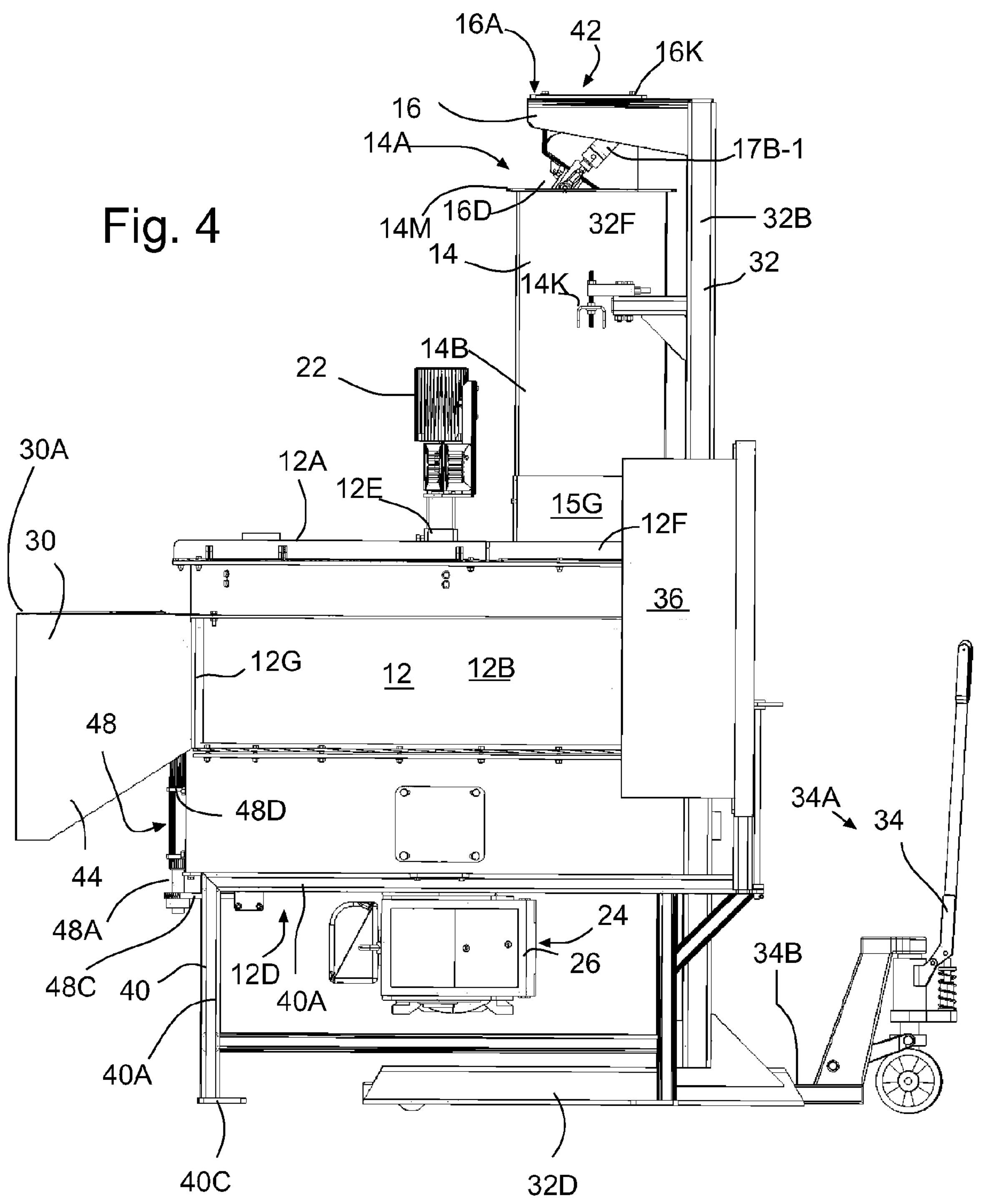
FIG. 4 is a side elevation view of the batch seed coating device of FIG. 1.
Figure 5:
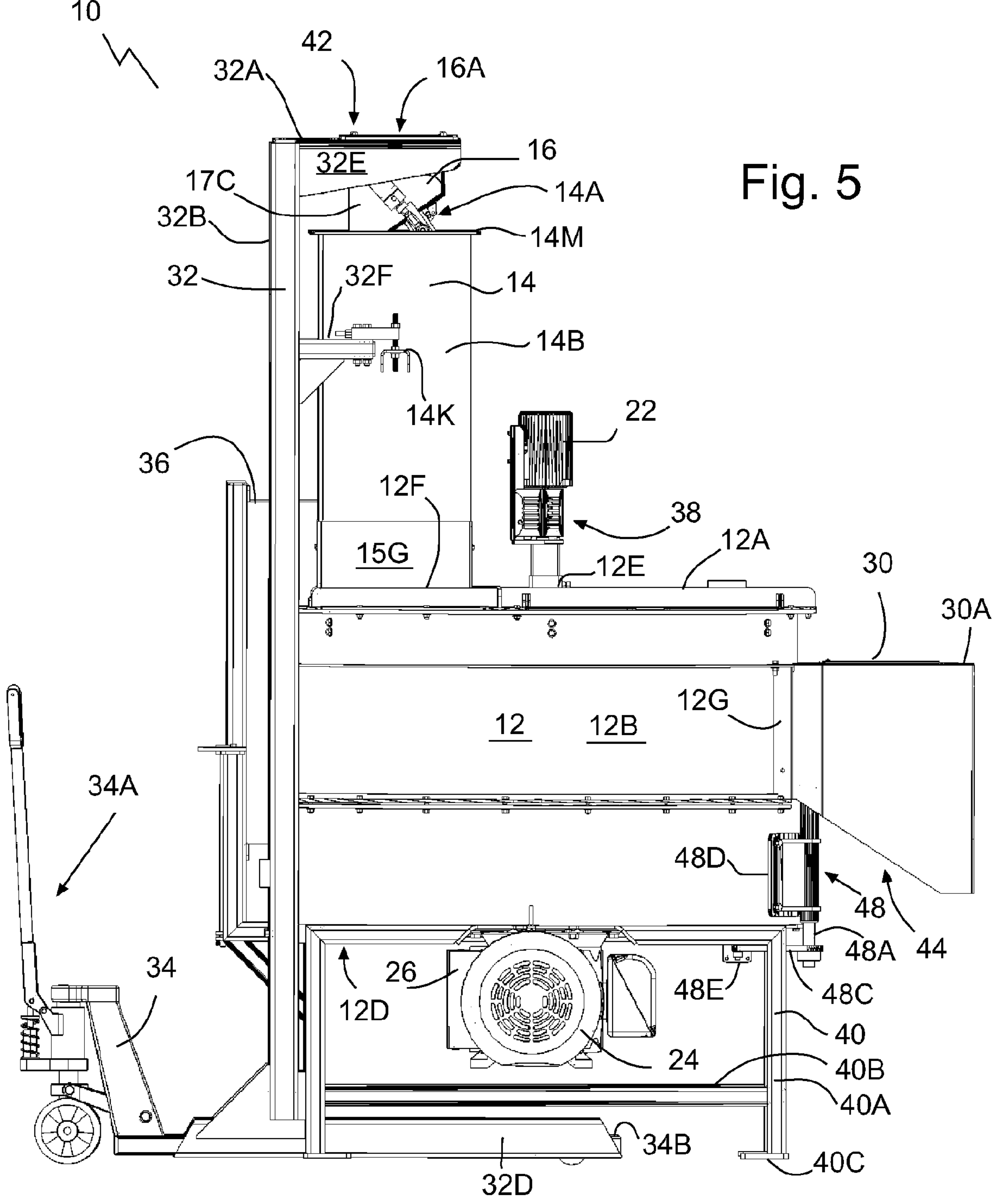
FIG. 5 is another side elevation view of the batch seed coating device of FIG. 1.
Figure 6:
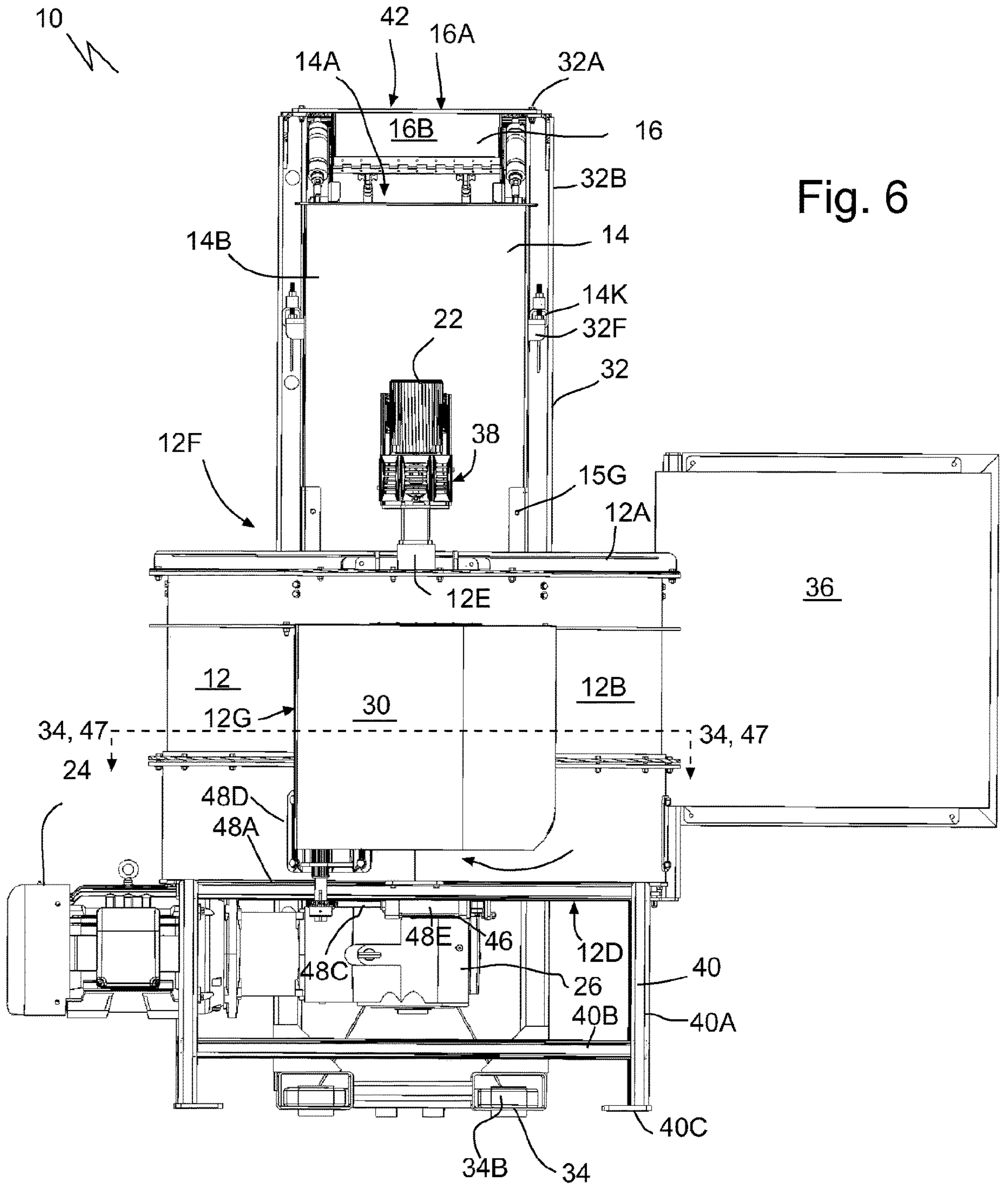
FIG. 6 is a front elevation view of the batch seed coating device of FIG. 1.

The systems and methods disclosed here may be used for the coating of suitable seeds, for example peanuts, and other large granular seeds will work, such as corn, soybean, peas, large diameter seeds. In some cases, the systems and methods create coated seeds that have an evenly applied coating, as uneven application of active agents may negatively affect germination rate. Suitable connections between parts may be used, such as hinges (including living and other hinges), connections through other parts using fasteners, using welding, adhesives, riveting, or other methods. Connections between parts stated to be at a particular location may be at or near that location unless context dictates otherwise. Various relative words are intended to be relative and not restricted to absolute values unless context dictates otherwise, for example front, rear, side, up, down, top, base, vertical, and horizontal are examples of words that are not to be taken absolutely unless context dictates otherwise. A hopper includes a device that can supply a product to another device. Suitable actuators may be used, such as hydraulic, screw, linear, or other actuators. A suitable controller may include one or more of a processor, a user interface such as a keyboard, a display, and a network connection. Referring to FIG. 3, the controller may be mounted on a swivel 150 or articulating arm, in order to pivot from a retracted, compact position (for example swung 180 degrees from the present position in FIG. 3 to sit against a rear of the hopper fill system and/or pallet jack) to an extended, operating position (for example as shown).

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A batch seed coating device comprising:

a housing forming a seed mixing bowl;

a stirring part mounted to stir, about a rotational axis, a mixture of seeds and seed coating within an interior of the seed mixing bowl;

a plurality of two or more mixing blades angularly spaced and mounted around the interior of the seed mixing bowl with a leading face of each mixing blade angled radially inward, from an interior surface of a cylindrical side wall of the housing to an inner edge of the mixing blade, along a direction of rotation about the rotational axis to, in use, direct the mixture travelling along the cylindrical side wall, radially inward and in the direction of rotation;

a discharge port in the cylindrical side wall, a moveable mixing blade mounted to move within the interior of the seed mixing bowl between:

a recirculating position where a leading face of the moveable mixing blade is angled to, in use, direct the mixture radially inward and in the direction of rotation; and a discharge position where the leading face of the moveable mixing blade is angled radially outward, from an inner edge of the moveable mixing blade to the interior surface of the cylindrical side wall of the housing, along the direction of rotation about the rotational axis to, in use, direct the mixture radially outward into the discharge port.

2. The batch seed coating device of claim 1 in which the leading face of each of the plurality of two or more mixing blades is oriented to form an obtuse angle with a circumference of rotation defined about the rotational axis.

3. The batch seed coating device of claim 1 in which each of the plurality of two or more mixing blades is tapered with increasing distance from the cylindrical side wall in a direction toward a top of the seed mixing bowl.

4. The batch seed coating device of claim 1 in which the stirring part comprises a rotary table.

5. The batch seed coating device of claim 4 in which the rotary table forms an inner bowl that nests within the seed mixing bowl.

6. The batch seed coating device of claim 1 further comprising a seed coating injector.

7. The batch seed coating device of claim 1 further comprising a seed coating dispersing mechanism comprising a rotary disc located coaxial with the rotational axis and oriented to disperse seed coating about the interior of the seed mixing bowl.

8. The batch seed coating device of claim 1 in which each of the plurality of two or more mixing blades has an anchor arm extended from a rear face of the mixing blade, the anchor arm secured to the cylindrical side wall of the interior of the seed mixing bowl.

9. The batch seed coating device of claim 1 further comprising a seed supply hopper.

10. The batch seed coating device of claim 9 in which the seed supply hopper comprises a discharge gate forming a scoop that is structured to swing down from an open base end of the seed supply hopper to direct seeds toward a side of the seed mixing bowl.

11. The batch seed coating device of claim 9 in which the seed supply hopper is oriented to supply seeds through a roof of the housing into the interior.

12. The batch seed coating device of claim 9 in which the seed supply hopper comprises a weigh bucket.

13. The batch seed coating device of claim 1 further comprising a discharge chute mounted to an exterior of the cylindrical side wall at the discharge port in the cylindrical side wall, the discharge chute having an arcuate leading interior wall shaped to direct coated seeds, which are discharged into the discharge chute from the interior through the discharge port, to move radially outward in a chute rotational direction that is opposite to the direction of rotation.

14. The batch seed coating device of claim 1 in which the leading face is planar.

15. A method comprising:

stirring a mixture of seeds and seed coating within an interior of a seed mixing bowl around a rotational axis of the seed mixing bowl;

in which while stirring, a plurality of two or more mixing blades, which are angularly spaced and mounted around the interior of the seed mixing bowl with a leading face of each mixing blade angled radially inward, from an interior surface of a cylindrical side wall of the seed mixing bowl to an inner edge of the mixing blade, along a direction of rotation about the rotational axis, direct the mixture, which is travelling along the cylindrical side wall, radially inward and in the direction of rotation;

moving a moveable mixing blade from a recirculating position where a leading face of the moveable mixing blade is angled radially inward to direct the mixture radially inward and in the direction of rotation along with the plurality of two or more mixing blades, into a discharge position where the leading face of the moveable mixing blade is angled radially outward, from an inner edge of the moveable mixing blade to the interior surface of the cylindrical side wall of the seed mixing bowl, along a direction of rotation about the rotational axis to, in use, direct the mixture radially outward into a discharge port; and discharging coated seeds from the discharge port in the cylindrical side wall.

16. The method of claim 15 in which stirring comprises rotating a rotary table that is nested within the seed mixing bowl.

17. The method of claim 15 further comprising injecting seed coating into the seed mixing bowl.

18. The method of claim 15 further comprising supplying seeds into the seed mixing bowl from a weigh bucket.

19. The method of claim 15 in which the leading face is planar.

* * * * *